US012754352B2

(12) United States Patent
Arima et al.

(10) Patent No.: US 12,754,352 B2
(45) Date of Patent: Oct. 6, 2026

(54) DIFFUSER PLATE, DISPLAY DEVICE, PROJECTING DEVICE, AND LIGHTING DEVICE

(71) Applicant: DEXERIALS CORPORATION, Tochigi (JP)

(72) Inventors: Mitsuo Arima, Tochigi (JP); Masayuki Ishiwata, Tochigi (JP); Shunsuke Kanasugi, Tochigi (JP)

(73) Assignee: DEXERIALS CORPORATION, Tochigi (JP)

(*) Notice: Subject to any disclaimer, the term of this patent is extended or adjusted under 35 U.S.C. 154(b) by 687 days.

(21) Appl. No.: 17/766,950

(22) PCT Filed: Oct. 22, 2020

(86) PCT No.: PCT/JP2020/039657
§ 371 (c)(1),
(2) Date: Apr. 6, 2022

(87) PCT Pub. No.: WO2021/079923
PCT Pub. Date: Apr. 29, 2021

(65) Prior Publication Data

US 2024/0077658 A1 Mar. 7, 2024

(30) Foreign Application Priority Data

Oct. 25, 2019 (JP) ................................ 2019-194363
Oct. 20, 2020 (JP) ................................ 2020-175853

(51) Int. Cl.
*G02B 5/02* (2006.01)
*G02B 3/06* (2006.01)

(52) U.S. Cl.
CPC ............ *G02B 5/0263* (2013.01); *G02B 3/06* (2013.01); *G02B 5/0294* (2013.01)

(58) Field of Classification Search
CPC ...... G02B 5/0263; G02B 3/06; G02B 5/0294; G02B 5/0215; G02B 3/0043; G02B 5/0221; G02B 5/0273
See application file for complete search history.

(56) References Cited

U.S. PATENT DOCUMENTS

2014/0376095 A1* 12/2014 Koyama ............... G02B 27/16 359/599
2015/0293271 A1* 10/2015 Miyasaka ........... G02B 5/0268 353/38

(Continued)

FOREIGN PATENT DOCUMENTS

CN 106461815 A 2/2017
CN 106716185 A 5/2017

(Continued)

OTHER PUBLICATIONS

Nov. 12, 2024, Japanese Office Action issued for related JP Application No. 2020-175853.

(Continued)

*Primary Examiner* — Sharrief I Broome
*Assistant Examiner* — K Muhammad
(74) *Attorney, Agent, or Firm* — Paratus Law Group, PLLC

(57) ABSTRACT

To reduce unevenness in a luminance distribution in two directions of microlenses disposed in a form of a rectangular grid to improve uniformity of light distribution. Provided is a diffuser plate of a microlens array type including a base material, and a microlens array composed of a plurality of microlenses disposed on an X-Y plane on at least one surface of the base material using a rectangular grid as a reference, in which grid intervals Wx in an X direction of the microlenses disposed in the X direction of the rectangular grid are different from each other, grid intervals Wy in a Y direction of the microlenses disposed in the Y direction of (Continued)

the rectangular grid are different from each other, and surface shapes of the plurality of microlenses are different from each other.

11 Claims, 33 Drawing Sheets

(56) References Cited

U.S. PATENT DOCUMENTS

| | | | | |
|---|---|---|---|---|
| 2017/0074481 | A1 | 3/2017 | Seki et al. | |
| 2017/0235028 | A1 | 8/2017 | Uchida et al. | |
| 2018/0106930 | A1* | 4/2018 | Uchida | G02B 3/0056 |
| 2018/0284326 | A1* | 10/2018 | Arima | G03B 21/14 |
| 2019/0146237 | A1* | 5/2019 | Uchida | G02B 5/0278 359/599 |

FOREIGN PATENT DOCUMENTS

| | | | |
|---|---|---|---|
| CN | 108139512 | A | 6/2018 |
| EP | 2916149 | A1 | 9/2015 |
| EP | 3343252 | A1 | 7/2018 |
| EP | 3550336 | A1 | 10/2019 |
| JP | 3289202 | B2 * | 6/2002 |
| JP | 2015-057765 | A | 3/2015 |
| JP | 2015-169804 | A | 9/2015 |
| JP | 2016-224212 | A | 12/2016 |
| JP | 2017-054017 | A | 3/2017 |
| JP | 2017-068216 | A | 4/2017 |
| JP | 2018-054769 | A | 4/2018 |
| JP | 2018-109670 | A | 7/2018 |
| TW | 201619663 | A | 6/2016 |
| WO | WO 2015/182619 | A1 | 12/2015 |
| WO | WO 2016/051785 | A1 | 4/2016 |
| WO | WO 2016/117452 | A1 | 7/2016 |
| WO | WO 2017/043063 | A1 | 3/2017 |
| WO | WO 2018/061816 | A1 | 4/2018 |
| WO | WO 2018/151097 | A1 | 8/2018 |
| WO | WO 2019/063733 | A1 | 4/2019 |

OTHER PUBLICATIONS

Dec. 7, 2023, Taiwanese Combined Office Action and Search Report issued for related TW Application No. 109136883.

Sep. 13, 2023, European Search Report issued for related EP Application No. 20878757.2.

Dec. 19, 2023, Japanese Office Action issued for related JP Application No. 2020-175853.

Oct. 25, 2023, Chinese Office Action issued for related CN Application No. 202080072883.0.

Jun. 4, 2024, Japanese Office Action issued for related JP Application No. 2020-175853.

Mar. 18, 2024, Chinese Office Action issued for related CN Application No. 202080072883.0.

Jun. 10, 2025, European Communication issued for related EP Application No. 20878757.2.

May 20, 2025, Japanese Office Action issued for related JP Application No. 2020-175853.

Jun. 11, 2026, European Communication issued for related EP Application No. 20878757.2.

* cited by examiner

| | COMPARATIVE EXAMPLE 1 |
|---|---|
| (a) |  |
| (b) |  |
| (c) |  |
| (d) | 15deg |

| COMPARATIVE EXAMPLE 2 | |
|---|---|
| (a) |  |
| (b) |  |
| (c) |  |
| (d) | 15deg |

| | COMPARATIVE EXAMPLE 3 |
|---|---|
| (a) |  |
| (b) |  |
| (c) |  |
| (d) | 15deg |

| EXAMPLE 1 | |
|---|---|
| (a) |  |
| (b) |  |
| (c) |  |
| (d) | 16deg |

| EXAMPLE 3 | |
|---|---|
| (a) |  |
| (b) |  |
| (c) |  |
| (d) | 15deg |

| | EXAMPLE 4 |
|---|---|
| (a) |  |
| (b) |  |
| (c) |  |
| (d) | 15deg |

| | EXAMPLE 5 |
|---|---|
| (a) |  |
| (b) |  |
| (c) |  |
| (d) | 15deg |

| EXAMPLE 6 | |
|---|---|
| (a) |  |
| (b) |  |
| (c) |  |
| (d) | 15deg |

<table>
<tr><th colspan="2">EXAMPLE 7</th></tr>
<tr><td>(e)</td><td>

FFP MEASUREMENT RESULT</td></tr>
<tr><td>(f)</td><td>X DIRECTION=11.9deg, Y DIRECTION=12.2deg</td></tr>
<tr><td>(g)</td><td></td></tr>
</table>

DIFFUSER PLATE, DISPLAY DEVICE, PROJECTING DEVICE, AND LIGHTING DEVICE

CROSS REFERENCE TO PRIOR APPLICATION

This application is a National Stage Patent Application of PCT International Patent Application No. PCT/JP2020/039657 (filed on Oct. 22, 2020) under 35 U.S.C. § 371, which claims priority to Japanese Patent Application Nos. 2019-194363 (filed on Oct. 25, 2019) and 2020-175853 (filed on Oct. 20, 2020) which are all hereby incorporated by reference in their entirety.

TECHNICAL FIELD

The present invention relates to a diffuser plate, a display device, a projecting device, and a lighting device.

BACKGROUND ART

In order to change an optical diffusion property, a diffuser plate that diffuses incident light to a desired direction is used. The diffuser plate is widely utilized in various devices such as, for example, a display device such as a display, a projecting device such as a projector, or various types of lighting devices. A type of diffuser plate utilizes light refraction resulting from the surface shape of the diffuser plate to diffuse incident light at a desired diffusion angle. As a diffuser plate of that type, a diffuser plate of a microlens array type in which a plurality of microlenses having sizes of approximately several tens of micrometers are arranged is known.

Such a diffuser plate of a microlens array type has problems in that, as a result of interference of a wavefront of light from each of microlenses, a diffraction wave due to a periodic structure of a microlens array occurs, which causes unevenness in intensity distribution of diffused light. Thus, a technology of varying the arrangement of microlenses, the shapes of lens surfaces, and the shapes of apertures to reduce unevenness in intensity distribution of diffused light caused by interference or diffraction has been proposed.

For example, Patent Literature 1 describes a diffuser plate including a plurality of microlenses regularly arranged on a principal surface in the form of a rectangular grid, in which a plurality of microlenses having sectional shapes different from each other and having no symmetrical axis are used. In addition, Patent Literature 2 describes arranging lens vertex positions of a plurality of microlenses disposed in the form of a rectangular grid away from grid points of a reference grid.

CITATION LIST

Patent Literature

Patent Literature 1: WO 2016/051785
Patent Literature 2: WO 2015/182619

SUMMARY OF INVENTION

Technical Problem

However, in an array structure in which a plurality of microlenses having no symmetrical axis and having sectional shapes different from each other are disposed regularly in the form of a rectangular grid as described in Patent Literature 1 above, unevenness in intensity distribution of diffused light is reduced merely by means of phase changes of light between microlenses adjacent to each other. Therefore, the effect of uniformly diffusing diffused light in two directions of the rectangular grid orthogonal to each other is restrictive. In addition, in an array structure disposed regularly in the form of a rectangular grid as described in Patent Literature 2, highly uniform light distribution control in the two directions of the rectangular grid cannot be achieved merely by shifting the vertex positions of the respective microlenses.

The present invention was therefore made in view of the above circumstances, and an object of the present invention is to reduce unevenness in a luminance distribution and improve uniformity of light distribution in two directions of microlenses disposed in the form of a rectangular grid.

Solution to Problem

According to an aspect of the present invention in order to solve the above-mentioned problems, provided is a diffuser plate of a microlens array type including a base material, and a microlens array composed of a plurality of microlenses disposed on an X-Y plane on at least one surface of the base material using a rectangular grid as a reference, in which grid intervals Wx in an X direction of the microlenses disposed in the X direction of the rectangular grid are different from each other, grid intervals Wy in a Y direction of the microlenses disposed in the Y direction of the rectangular grid are different from each other, and surface shapes of the plurality of microlenses are different from each other.

The grid intervals Wx in the X direction may be each varied at random at a varying rate δWx within ±10% to ±50% using a reference grid interval Wx_k as a reference, and the grid intervals Wy in the Y direction may be each varied at random at a varying rate δWy within ±10% to ±50% using a reference grid interval Wy_k as a reference.

Curvature radii Rx in the X direction of the microlenses disposed in the X direction may be varied from each other, and curvature radii Ry in the Y direction of the microlenses disposed in the Y direction may be varied from each other.

The curvature radii Rx in the X direction may be each varied at random at a varying rate δRx within ±10% to ±50% using a reference curvature radius Rx_k as a reference, and the curvature radii Ry in the Y direction may be each varied at random at a varying rate δRy within ±10% to ±50% using a reference curvature radius Ry_k as a reference.

The grid intervals Wx in the X direction may be each varied at random at a varying rate δWx within ±10% to ±50% using a reference grid interval Wx_k as a reference, the grid intervals δWy in the Y direction may be each varied at random at a varying rate δWy within ±10% to ±50% using a reference grid interval Wy_k as a reference, the reference grid intervals Wx_k, Wy_k and the reference curvature radii Rx_k, Ry_k may satisfy relational expressions (A) and (B) below, and a diffusion angle (a full width at half maximum) achieved by the diffuser plate may be less than or equal to 20°:

$$Rx\_k/Wx\_k \geq 1.85; \text{ and} \tag{A}$$

$$Ry\_k/Wy\_k \geq 1.85. \tag{B}$$

A planar position of a vertex of each of the microlenses disposed in the X direction and the Y direction may be off-centered from a central point of each of rectangles of the rectangular grid.

When distances in the X direction and the Y direction from the central point of each of the rectangles to the planar position of the vertex of each of the microlenses having been off-centered are denoted by an off-centering amount Ecx and an off-centering amount Ecy, respectively, and proportions of the off-centering amounts Ecx and Ecy with respect to the grid intervals Wx and Wy of the rectangular grid are denoted by an off-centering rate δEcx and an off-centering rate δEcy, respectively, the planar position of the vertex of each of the microlens may be off-centered at random at the off-centering rates δEcx and δEcy within ±10% to ±50%.

Height positions of vertices of the plurality of microlenses disposed in the X direction and the Y direction may be different from each other.

The microlenses disposed in the X direction and the Y direction may be arranged continuously with no gap between each other.

A boundary line between adjacent ones of the microlenses may include a straight line and a curve.

The microlens array may include a plurality of unit cells which are basic arrangement patterns of the microlenses, and the microlens array may be configured by disposing the plurality of unit cells with no gap between each other while maintaining continuity of the microlenses at boundary portions between the plurality of unit cells.

Surface shapes of the microlenses may be spherical shapes, or aspherical shapes having anisotropy in the X direction or the Y direction.

According to another aspect of the present invention in order to solve the above-mentioned problems, a display device including the above-described diffuser plate is provided.

According to another aspect of the present invention in order to solve the above-mentioned problems, a projecting device including the above-described diffuser plate is provided.

According to another aspect of the present invention in order to solve the above-mentioned problems, a lighting device including the above-described diffuser plate is provided.

Advantageous Effects of Invention

As described above, the present invention can reduce unevenness in a luminance distribution and improve uniformity of light distribution in two directions of microlenses disposed in the form of a rectangular grid.

DESCRIPTION OF EMBODIMENTS

Figure 1:
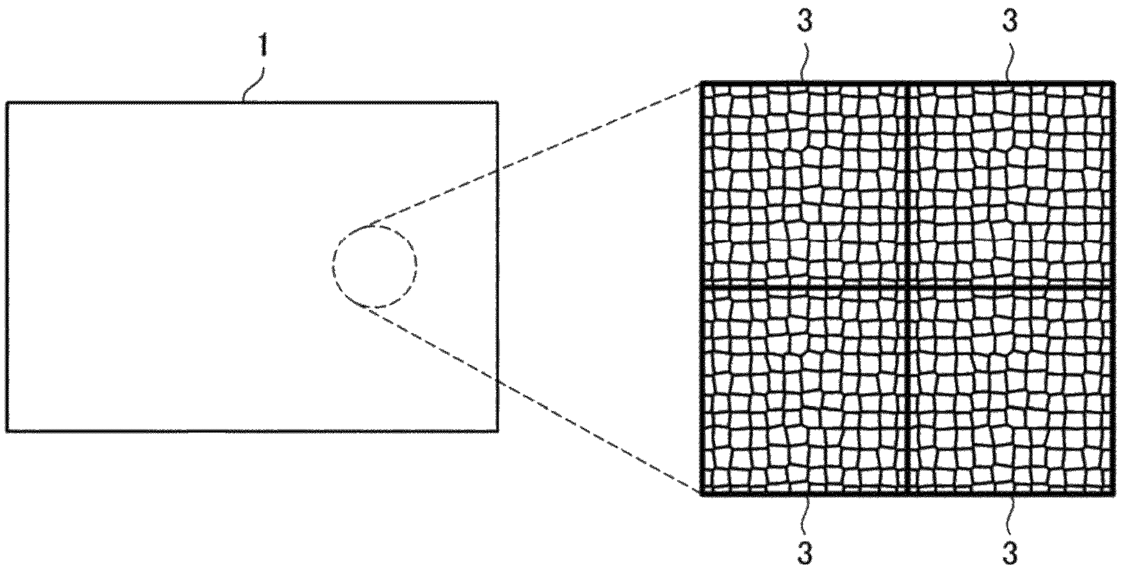
FIG. 1 is an explanatory diagram schematically showing a diffuser plate according to an embodiment of the present invention.

Hereinafter, (a) preferred embodiment(s) of the present invention will be described in detail with reference to the appended drawings. Note that, in the present specification and the drawings, structural elements that have substantially the same function and structure are denoted with the same reference numerals, and repeated explanation is omitted.

<1. Overview of Diffuser Plate>

First, an overview of a diffuser plate according to an embodiment of the present invention will be described.

The diffuser plate according to the present embodiment which will be described below in detail is a diffuser plate of a microlens array type having a function of uniformly diffusing light. Such a diffuser plate has a microlens array formed on the X-Y plane on at least one surface (a principal surface) of a base material. The microlens array is composed of a plurality of microlenses disposed and deployed in the form of a rectangular grid. The microlens has a convex structure (convex lens) or a concave structure (concave lens) having a light diffusing function, and has a lens diameter of approximately several tens of micrometers.

Then, in the diffuser plate according to the present embodiment, the plurality of microlenses are disposed in the form of a rectangular grid (in the form of a matrix) using a rectangular grid having irregularity as a reference. In this rectangular grid having irregularity, a plurality of grid intervals Wx in the X direction (a row direction) are varied at random and different from each other, and a plurality of grid intervals Wy in the Y direction (a column direction) are also varied at random and different from each other. Furthermore, curvature radii Rx and Ry of the plurality of microlenses disposed in the X and Y directions are varied at random (irregularly) to be different from each other. In addition, the planar position of the vertex of each of the microlenses is varied at random (off-centered) so as to be shifted from the central point of each of rectangles of the rectangular grid. In addition, the height positions in the Z direction of the vertices of the plurality of microlenses (the positions in the thickness direction of the diffuser plate) are also vaned at random and different from each other. By varying the grid intervals Wx, Wy, the curvature radii Rx, Ry, the planar positions and height positions of the lens vertices, and the like at random in this manner, the surface shapes of the plurality of microlenses deployed in the form of a rectangular grid are varied at random and have shapes different from each other.

In this manner, the diffuser plate according to the present embodiment achieves a three-dimensional surface structure of a highly random microlens array by varying the respective varying elements of the plurality of microlenses at random. This enables an overlapping state of phases of light emitted from the respective microlenses to be controlled. As a result, a surface structure of a diffuser plate can be provided which has highly-transmissive luminance properties, satisfies uniformity of light distribution in two directions (the X and Y directions) orthogonal to each other, and may control sufficient anisotropy in light distribution and a cut-off property of intensity distribution of diffused light.

Furthermore, according to the present embodiment, the plurality of microlenses are disposed on the X-Y plane using the irregular rectangular grid having the grid intervals Wx and Wy different from each other as a reference. This enables the plurality of microlenses to be arranged continuously with no gap between each other on the surface of the diffuser plate while ensuring randomness of the surface shape of each of the microlenses. This can prevent a flat portion from existing at the boundary portion between the microlenses adjacent to each other when possible. Thus, unevenness in intensity distribution of diffused light can further be reduced to further improve uniformity of light distribution in the two directions (the X and Y directions).

Hereinafter, the diffuser plate according to the present embodiment having characteristics as described above will be described in detail.

<2. Overall Configuration of Diffuser Plate>

First, an overall configuration of the diffuser plate according to an embodiment of the present invention and a layout pattern of microlenses will be described with reference to FIG. 1. FIG. 1 is an explanatory diagram schematically showing a diffuser plate 1 according to the present embodiment.

The diffuser plate 1 according to the present embodiment is a diffuser plate of a microlens array type in which a microlens array composed of a plurality of microlenses (single lenses) is arranged on a substrate. The microlens array of the diffuser plate 1 is composed of a plurality of unit cells 3 as shown in FIG. 1. The unit cell 3 is a basic arrangement pattern of microlenses. A plurality of microlenses are arranged in a predetermined layout pattern (arrangement pattern) on the surface of each of the unit cells 3.

Herein, FIG. 1 shows an example in which the unit cell 3 constituting the diffuser plate 1 has a rectangular shape, in particular, a square shape. However, the shape of the unit cell 3 is not limited to the example shown in FIG. 1, but may have any shape that can cover the surface (on the X-Y plane) of the diffuser plate 1 with no gap, such as, for example, regular triangle or regular hexagon.

In the example of FIG. 1, the plurality of unit cells 3 having a square shape are repeatedly disposed vertically and laterally on the surface of the diffuser plate 1. The number of unit cells 3 constituting the diffuser plate 1 according to the present embodiment is not particularly limited, and the diffuser plate 1 may be composed of a single unit cell 3 or may be composed of a plurality of unit cells 3. In the diffuser plate 1 according to the present embodiment, the unit cells 3 having surface structures different from each other may be arranged repeatedly, or the unit cells 3 having a surface structure identical to each other may be arranged repeatedly.

In addition, as schematically shown in a magnified view on the right in FIG. 1, layout patterns (arrangement patterns) of a plurality of microlenses provided in the unit cells 3 continue in a disposition direction of the unit cells 3 (that is, an array disposition direction). The microlens array is formed by disposing the unit cells 3 with no gap while maintaining continuity of the microlenses at the boundary portions between the plurality of unit cells 3. Herein, the continuity of the microlenses indicates that a microlens located at the outer edge of one of two unit cells 3 adjacent to each other and a microlens located at the outer edge of the other unit cell 3 are continuously connected with no mismatch in planar shape or a level difference in the height direction.

In this manner, in the diffuser plate 1 according to the present embodiment, the microlens array is formed by disposing the unit cells 3 (basic structures) of the microlens array with no gap while maintaining continuity of the boundaries. This can prevent an unintended defect such as diffraction, reflection, or scattering of light from occurring at the boundary portions between the unit cells 3 to obtain a desired light distribution property with the diffuser plate 1.

<3. Configuration of Diffuser Plate>

Figure 2:
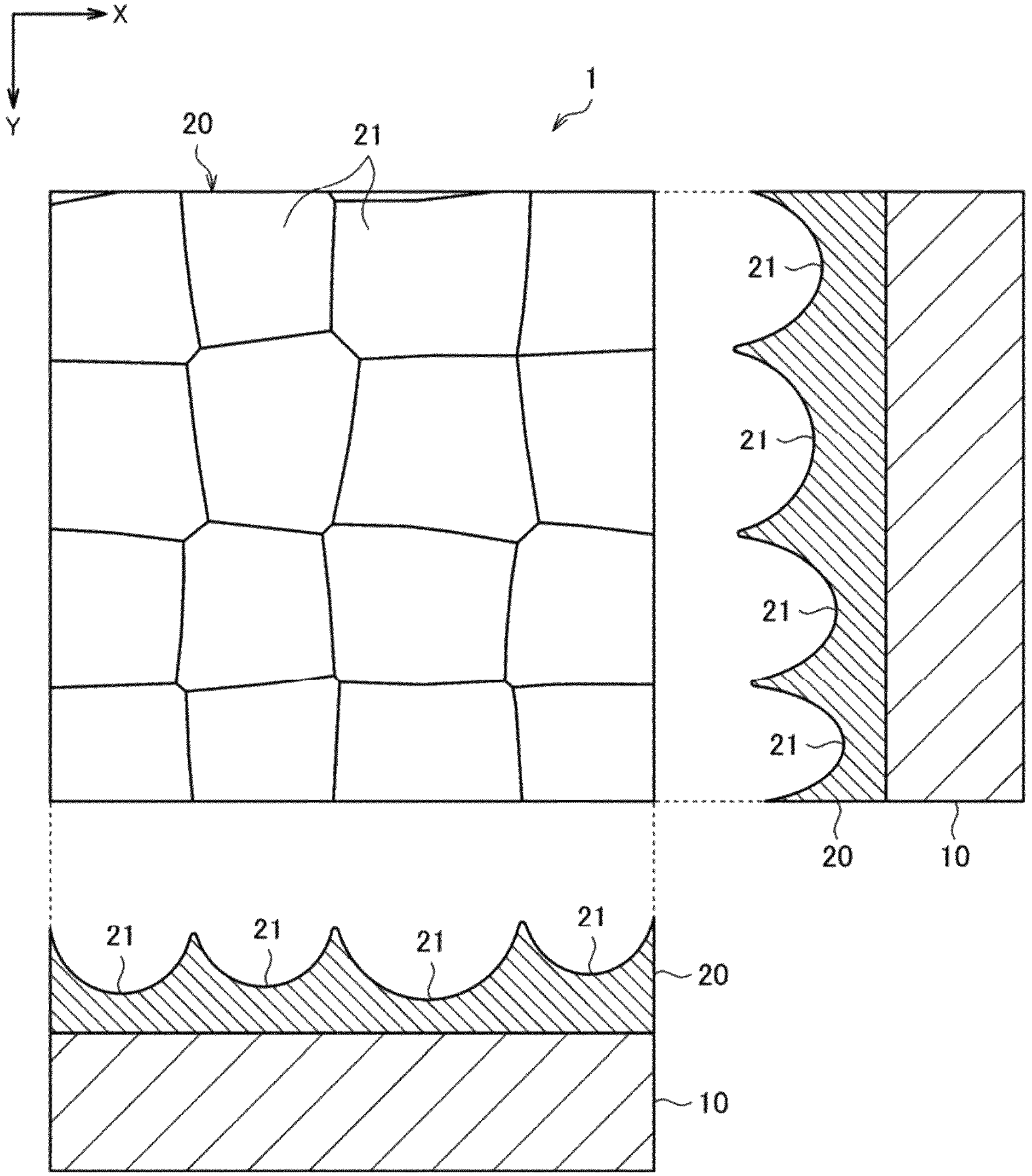
FIG. 2 is a magnified plan view and magnified sectional views schematically showing a configuration of the diffuser plate according to the embodiment.
Figure 3:
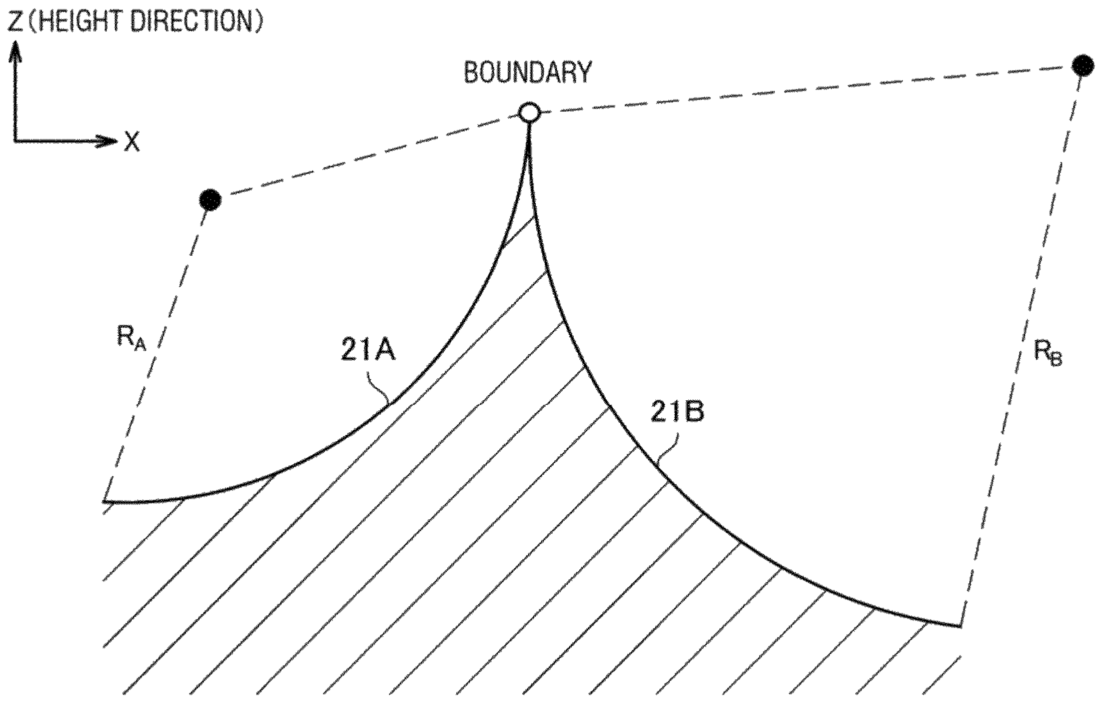
FIG. 3 is a magnified sectional view schematically showing the vicinity of a boundary between microlenses according to the embodiment.

A configuration of the diffuser plate 1 according to the present embodiment will now be described in more detail with reference to FIG. 2 to FIG. 4. FIG. 2 includes a magnified plan view and magnified sectional views schematically showing the configuration of the diffuser plate 1 according to the present embodiment. FIG. 3 is a magnified sectional view schematically showing the vicinity of a boundary between microlenses 21 according to the present embodiment.

Figure 4:
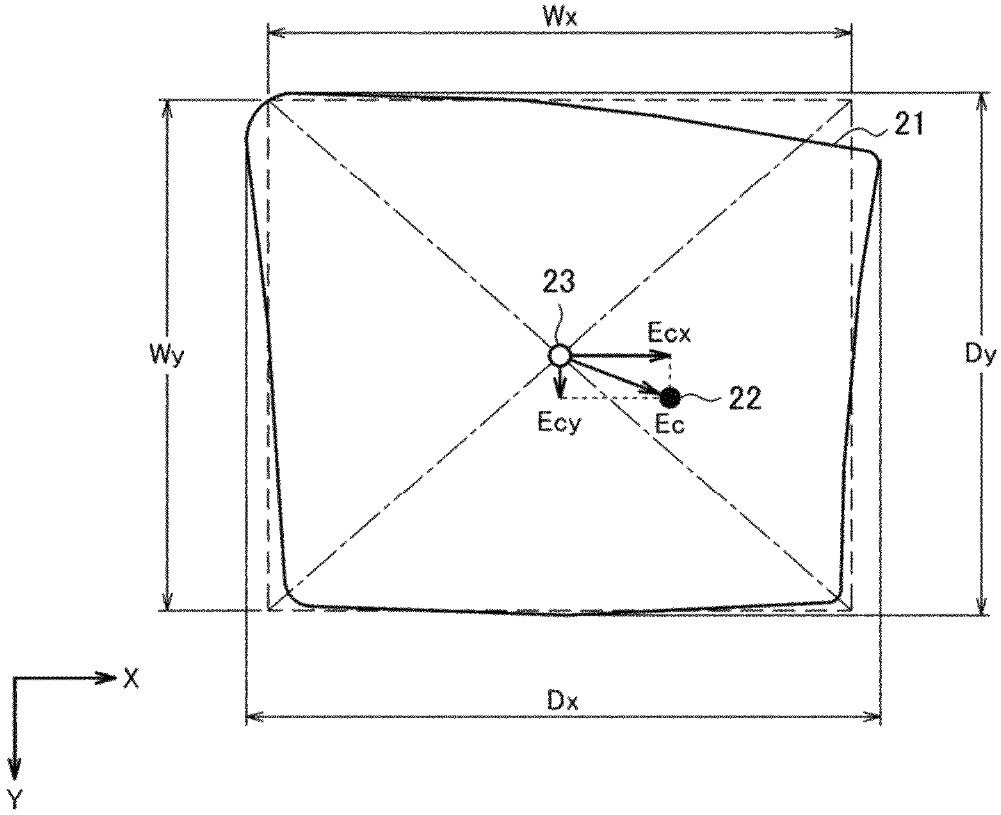
FIG. 4 is a plan view schematically showing a planar shape (contour) of a microlens according to the embodiment.

FIG. 4 is a plan view schematically showing a planar shape (contour) of the microlens 21 in a case of seeing the microlens 21 in plan view in a direction vertical to the surface of a base material 10.

As shown in FIG. 2, the diffuser plate 1 according to the present embodiment includes the base material 10 and a microlens array 20 formed on a surface of the base material 10.

First, the base material 10 will be described. The base material 10 is a substrate for supporting the microlens array 20. The base material 10 may be film like or plate like. The base material 10 shown in FIG. 2 has a rectangular flat-plate like shape, for example, but is not limited to such an example. The shape and thickness of the base material 10 may be any shape and thickness depending on the shape of a device on which the diffuser plate 1 is to be mounted.

The base material 10 is a transparent base material capable of transmitting light. The base material 10 is formed of a material that can be assumed as being transparent in a wavelength band of light incident on the diffuser plate 1. For example, the base material 10 may be formed of a material having a light transmittance of more than or equal to 70% in a wavelength band corresponding to visible light.

The base material 10 may be formed of publicly-known resin such as polymenthyl methacrylate (PMMA), Polyethylene terephthalate (PET), polycarbonate (PC), Cyclo Olefin Copolymer (COC), Cyclo Olefin Polymer (COP), or Triacetylcellulose (TAC), for example. Alternatively, the base material 10 may be formed of publicly-known optical glass such as quartz glass, borosilicate glass, or high transmission crown glass.

The microlens array 20 will now be described. The microlens array 20 is provided on at least one surface (a principal surface) of the base material 10. The microlens array 20 is an assembly of the plurality of microlenses 21 (single lenses) disposed on the surface of the base material 10. In the present embodiment, the microlens array 20 is formed on one surface of the base material 10 as shown in FIG. 2. However, this is not a limitation, and the microlens array 20 may be formed on both principal surfaces (front and rear surfaces) of the base material 10.

The microlenses 21 are fine optical lenses on the order of several tens of micrometers, for example. The microlenses 21 constitute single lenses of the microlens array 20. The microlens 21 may have a concave structure (concave lens) formed to be recessed in the thickness direction of the diffuser plate 1, or may have a convex structure (convex lens) formed to protrude in the thickness direction of the diffuser plate 1. The present embodiment will describe an example in which the microlenses 21 have concave structures (concave lenses) as shown in FIG. 2, but such an example is not a limitation. The microlenses 21 may have convex structures (convex lenses) depending on a desired optical property of the diffuser plate 1.

The surface shape of each of the microlenses 21 is not particularly limited as long as it is a curved surface shape including a curved surface component. The surface shape of the microlens 21 may be a spherical shape only including a spherical component, for example, or may be an aspherical shape including a spherical component and an aspherical component, or may be an aspherical shape only including an aspherical component.

As shown in FIG. 2, the plurality of microlenses 21 preferably are arranged densely so as to be adjacent to each other with no gap. In other words, the plurality of microlenses 21 preferably are arranged continuously such that no gap (flat portion) exists at the boundary portion between the microlenses 21 adjacent to each other. By arranging the microlenses 21 on the base material 10 with no gap (that is, arranging the microlenses 21 such that the filling rate of the microlenses 21 is 100%), a component of incident light that transmits as it is through the surface of the diffuser plate 1 without scattering on the surface of the diffuser plate 1 (hereinafter, also referred to as a "0-th order transmitted light component") can be reduced. As a result, diffusion performance can be improved further with the microlens array 20 in which the plurality of microlenses 21 are arranged so as to be adjacent to each other with no gap.

Note that, in order to reduce the 0-th order transmitted light component, the filling rate of the microlenses 21 on the base material 10 preferably is more than or equal to 90%, and more preferably is 100%. Herein, the filling rate is the proportion of the area of a portion occupied by the plurality of microlenses 21 on the surface of the base material 10. If the filling rate is 100%, the surface of the microlens array 20 is formed by a curved surface component, and will hardly include a flat surface component.

However, since the curved surfaces of the plurality of microlenses 21 are connected continuously in actual manufacturing of the microlens array 20, the vicinity of an inflection point at the boundary between the microlenses 21 adjacent to each other may become generally flat. In such a case, the width of a region in the vicinity of the inflection point (the width of the boundary line between the microlenses 21) which becomes generally flat at the boundary between the microlenses 21 preferably is less than or equal to 1 μm. The 0-th order transmitted light component can thereby be reduced sufficiently.

In addition, in the microlens array 20 according to the present embodiment, the plurality of microlenses 21 are not arranged at random (irregularly), but as shown in FIG. 2, are arranged regularly to some extent (hereinafter referred to as "quasi-regularly") using, as a reference, an irregular rectangular grid (see FIG. 5) in which the grid intervals Wx and Wy are varied in the X direction and the Y direction. Herein, the term "random" indicates that no substantial regularity exists in the arrangement of the microlenses in any region of the microlens array. However, even if some regularity exists in the arrangement of the microlenses in a minute region, any region having no regularity in the arrangement of the microlenses as a whole shall be included in the case of "irregular".

In the present embodiment, the plurality of microlenses 21 are arranged quasi-regularly using a rectangular grid having irregularity as a reference. Then, the surface shapes and planar shapes of the microlenses 21 are varied at random. As shown in FIG. 2 and FIG. 4, the planar shapes (contours) of the microlenses 21 are shapes close to a generally rectangular shape as a whole, but are not complete rectangular shapes (square shapes or rectangular shapes) corresponding to the rectangular grid. Specifically, the planar shapes of the microlenses 21 are close to a generally polygon having four or more vertices, such as a generally quadrilateral, generally pentagonal, or generally hexagonal shape. Then, the surface shapes (sterical curved surface shapes) and planar shapes (shapes projected on the X-Y plane of the base material 10) of the plurality of microlenses 21 are different from each other. In this manner, the reason why each of the microlenses 21 has a shape deformed irregularly from a rectangular shape is because the curvature radii Rx, Ry, aperture sizes Dx, Dy, the planar positions and height positions of the lens vertices, and the like of the respective microlenses 21 are varied at random within ranges of predetermined varying rates. Note that the details of a method of quasi-regularly arranging the microlenses 21 using the rectangular grid as a reference according to the present embodiment will be described later (see FIG. 5 to FIG. 7).

In this manner, in the present embodiment, the curvature radii Rx, Ry and the aperture sizes Dx, Dy of the respective microlenses 21 are vaned at random, and have variations. Note that the aperture sizes Dx and Dy of the microlenses 21 are equivalent to lens diameters of single lenses. The phase distribution of an optical aperture of each of the microlenses 21 differs depending on the orientation. The plurality of microlenses 21 are arranged continuously on the surface of the base material 10 in a manner overlapping each other, and the curvature radii Rx, Ry and the aperture sizes Dx, Dy (lens diameters) of the respective microlenses 21 have variations. Accordingly, the shapes (surface shapes and planar shapes) of the plurality of microlenses 21 are not identical shapes to each other. Therefore, the plurality of microlenses 21 have various shapes as shown in FIG. 2, and many of them do not have symmetry.

As a result, as shown in FIG. 3, a state is brought about in which a microlens 21A has a curvature radius $R_A$, while a microlens 21B adjacent to the microlens 21A has a curvature radius $R_B$ ($\neq R_A$). In a case in which the curvature radii $R_A$ and $R_B$ of the microlenses 21 adjacent to each other are different from each other, the boundary line between the microlenses 21 adjacent to each other is not composed only of a straight line, but includes a curve at least partially.

Specifically, in a case of seeing a microlens 21 in plan view in the Z direction vertical to the surface of the base material 10 as shown in FIG. 4, the contour line of the planar shape of the microlens 21 (the boundary line between the microlens 21 and adjacent other microlenses 21) includes a plurality of curves having curvature radii different from each other and straight lines. In a case in which the boundary line between the microlenses 21 includes a plurality of curves having curvature radii different from each other, regularity of the boundary between the microlenses 21 is further deformed. This can further reduce the diffraction component of diffused light.

<4. Method of Arranging Microlenses>

Figure 5:
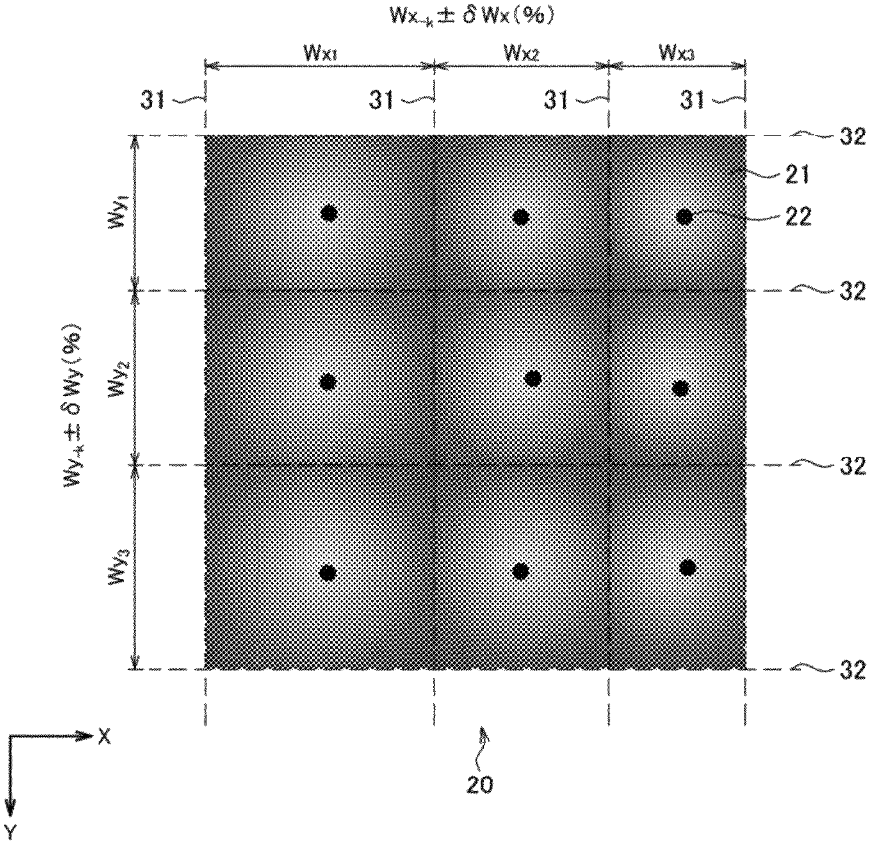
FIG. 5 is a plan view schematically showing arrangement of microlenses in the form of an irregular rectangular grid according to the embodiment.
Figure 6:
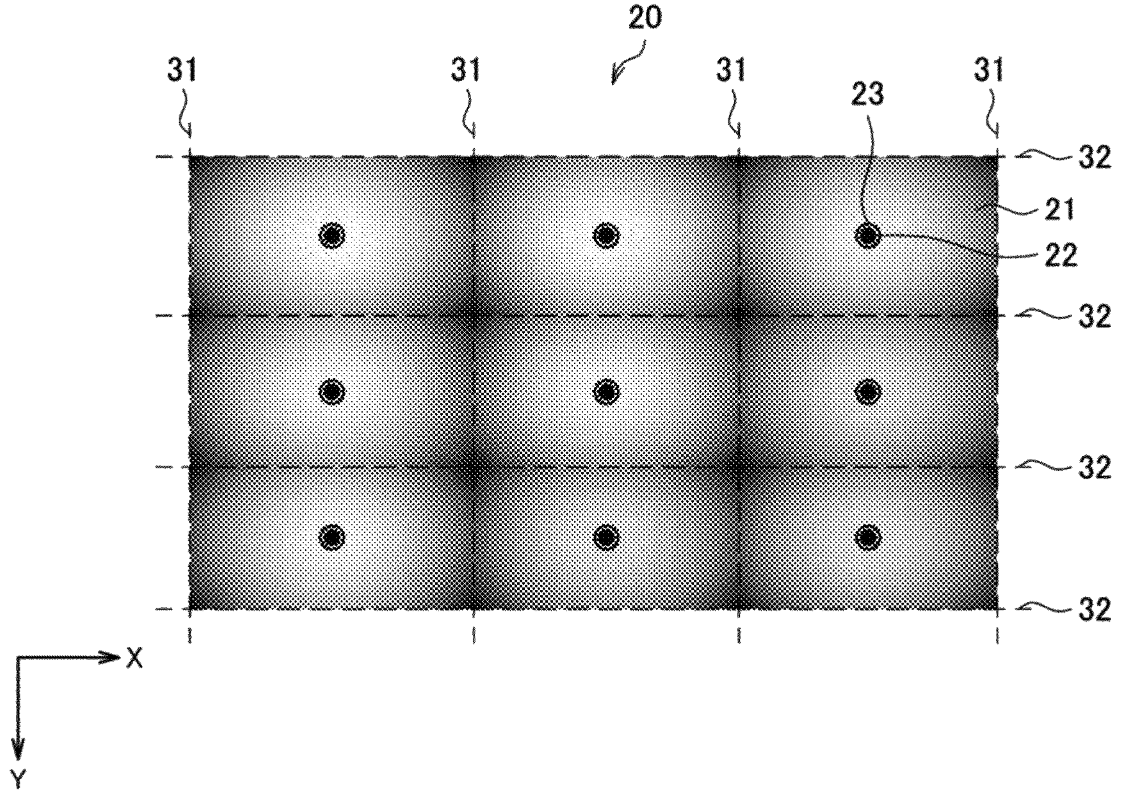
FIG. 6 is an explanatory diagram showing an example obtained by varying the surface shapes of the microlenses from those in the state of FIG. 5.
Figure 7:
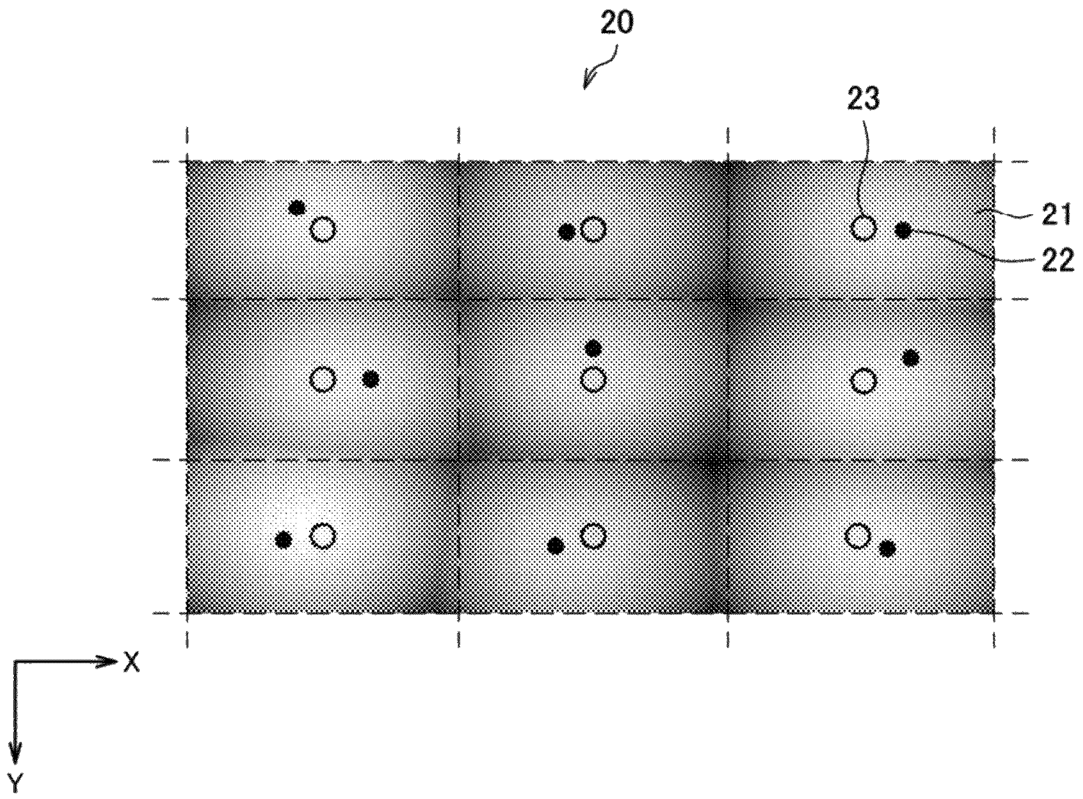
FIG. 7 is an explanatory diagram showing an example obtained by off-centering vertex positions of the microlenses from those in the state of FIG. 6.

A method of arranging the microlenses 21 according to the present embodiment will now be described in detail with reference to FIG. 5 to FIG. 7. FIG. 5 is a plan view schematically showing an arrangement of the microlenses 21 in the form of an irregular rectangular grid according to the present embodiment. FIG. 6 is an explanatory diagram showing an example obtained by varying the surface shapes of the microlenses 21 from those in the state of FIG. 5. FIG. 7 is an explanatory diagram showing an example obtained by off-centering the planar positions of the vertices 22 of the microlenses 21 from those in the state of FIG. 6.

The microlens array 20 in which the plurality of microlenses 21 having characteristics as described above are disposed can be achieved by the arrangement method according to the present embodiment which will be described below.

First, as shown in FIG. 5, a reference state (hereinafter also referred to as an "initial disposition state") in which the plurality of microlenses 21 having a reference shape are disposed quasi-regularly in the form of a rectangular grid is set once. Then, the initial disposition state is changed to a state (hereinafter also referred to as a "varied disposition state") obtained by varying the shapes (that is, the curvature radii Rx, Ry, the aperture sizes Dx, Dy, and the like) of the microlenses 21 and the positions of the vertices 22 of the microlenses 21 at random, as shown in FIG. 6 and FIG. 7. Hereinafter, such a method of arranging the microlenses 21 will be referred to as a "reference arrangement method".

In this reference arrangement method, upon experiencing the quasi-regular disposition of the microlenses 21 (see FIG. 5), the shapes and arrangement of the microlenses 21 are provided with randomness (see FIG. 6 and FIG. 7). Therefore, when looking down at the microlens array 20 in the final varied disposition state (see FIG. 2 and FIG. 7) macroscopically to some degree, the arrangement of the microlenses 21 is such that the quasi-regular initial disposition state (see FIG. 5) can be estimated to some degree. Hereinafter, this reference arrangement method will be described in detail.

(1) Initial Disposition State of the Microlenses 21 Using the Irregular Rectangular Grid as a Reference (FIG. 5)

In the reference arrangement method according to the present embodiment, the initial disposition state to be used as a reference for the arrangement of the microlenses 21 is set first. Specifically, in the initial disposition state, the plurality of microlenses 21 are disposed on the X-Y plane of a reference surface regularly to some extent (quasi-regularly) using a rectangular grid having irregularity as a reference as shown in FIG. 5.

The rectangular grid according to the present embodiment may be composed of rectangles or squares. As shown in FIG. 5, the rectangular grid includes a plurality of grid lines 32 extending in a first direction (the X direction) and a plurality of grid lines 31 extending in a second direction (the Y direction). The first direction (the X direction) and the second direction (the Y direction) are orthogonal to each other. In the rectangular grid, the grid intervals Wx in the X direction are intervals of the plurality of grid lines 31 extending in the second direction (the Y direction). The grid intervals Wy in the Y direction are intervals of the plurality of grid lines 32 extending in the first direction (the X direction).

Herein, the above-described irregular rectangular grid is such a rectangular grid in which the grid intervals Wx in the X direction are varied at random and different from each other, and the grid intervals Wy in the Y direction are varied at random and different from each other, as shown in FIG. 5. In the example of the rectangular grid in FIG. 5, three grid intervals $Wx_1$, $Wx_2$, and $Wx_3$ in the X direction are different from each other, and three grid intervals $Wy_1$, $Wy_2$, and $Wy_3$ in the Y direction are also different from each other. The grid intervals Wx and the grid intervals Wy may not be correlated with each other, and may each be varied independently at random. As a result, the grid intervals $Wx_1$, $Wx_2$, $Wx_3$, $Wy_1$, $Wy_2$, and $Wy_3$ in the X direction and the Y direction, for example, may be different from each other.

A method of varying the grid intervals Wx and the grid intervals Wy at random is as follows, for example. First, constant reference values Wx_k and Wy_k (hereinafter referred to as reference grid intervals Wx_k and Wy_k) to be used as references for varying the grid intervals Wx and Wy in the X direction and the Y direction are set. Then, the reference grid intervals Wx_k and Wy_k are varied at random within ranges of predetermined varying rates δWx and δWy [±%] to set the grid intervals Wx and Wy (Wx=Wx_k×(100±δWx [%]), Wy=Wy_k×(100±δWy [%])). This is repeated by the number of rectangles of the rectangular grid to set the plurality of grid intervals $Wx_1$, $Wx_2$, $Wx_3$, . . . , and $Wy_1$, $Wy_2$, $Wy_3$, . . . in the X direction and the Y direction, respectively.

Herein, the varying rates δWx and Wy preferably fall within a range of ±10% to ±50%. If the varying rates δWx and δWy are set to be less than ±10%, variations in the grid intervals Wx and Wy will be insufficient, which could make it difficult to provide the microlens array 20 with sufficient aperiodicity, and uniformity of diffused light through the microlens array 20 could be degraded. On the other hand, if the varying rates δWx and δWy are set to be more than ±50%, variations in the grid intervals W will be excessively large, which could make it difficult to continuously dispose the plurality of microlenses 21 on the X-Y plane with no gap.

For example, in the case in which the varying rates δWx and δWy are set at "±10%", the grid intervals Wx and Wy are set at values shifted at random from the reference grid intervals Wx_k and Wy_k within the range of less than or equal to "±10%" using the reference grid intervals Wx_k and Wy_k as references (that is, more than or equal to values of 90% and less than or equal to values of 110% of Wx_k and Wy_k).

In the foregoing manner, the plurality of grid intervals $Wx_1$, $Wx_2$. $Wx_3$, . . . , and $Wy_1$, $Wy_2$, $Wy_3$, . . . in the X direction and the Y direction are set at values different from each other at random in the present embodiment. Then, using the grid intervals $Wx_1$, $Wx_2$, $Wx_3$, . . . , and $Wy_1$, $Wy_2$. $Wy_3$, . . . , an irregular rectangular grid (see FIG. 5) in which the grid intervals Wx and Wy are different from each other is set.

Then, the plurality of microlenses 21 are disposed on the X-Y plane using the above-described irregular rectangular grid as a reference, as shown in FIG. 5. This state is the initial disposition state to be used as a reference for the arrangement of the microlenses 21. In the initial disposition state, the planar shapes of the respective microlenses 21 are rectangular shapes corresponding to the rectangles, and the contour lines of the planar shapes of the microlenses 21 agree with the grid lines 31 and 32 in the X direction and the Y direction. In addition, the position of the vertex 22 of each of the microlenses 21 agrees with a central point 23 of each of the rectangles enclosed by the grid lines 31 and 32. In addition, in this initial disposition state, the aperture sizes Dx and Dy in the X direction and the Y direction of each of the microlenses 21 agree with the grid intervals Wx and Wy in the X direction and the Y direction, respectively. Herein, since the grid intervals Wx and Wy are varied to values different from each other, the aperture sizes Dx and Dy are also varied to values different from each other.

In addition, the surface shape of each of the microlenses 21 in the initial disposition state is a shape obtained by cutting out a predetermined reference shape previously set (for example, an aspherical reference shape) with a rectangle corresponding to each of the microlenses 21. Herein, since the grid intervals Wx and Wy corresponding to the respective microlenses 21 are different from each other, the aperture sizes Dx, Dy and the surface shapes of the plurality of microlenses 21 are different from each other. In other words, by disposing the plurality of microlenses 21 using the above-described irregular rectangular grid as a reference, the plurality of microlenses 21 can be arranged such that the aperture sizes Dx, Dy and the surface shapes of the microlenses 21 are different from each other in the initial disposition state.

(2) First Varied Disposition State of the Microlenses 21 Obtained by Varying the Curvature Radii Rx and Ry (FIG. 6)

By varying the curvature radii Rx and Ry of the microlenses 21 at random as shown in FIG. 6 after setting the initial disposition state as described above, a first varied disposition state in which the surface shapes of the microlenses 21 have been vaned is set. FIG. 6 shows an example obtained by, in a case in which the surface shapes of the microlenses 21 are aspherical shapes having anisotropy in the X direction, varying the curvature radii Rx and Ry of the aspherical shapes.

The curvature radius R includes the curvature radius Rx of a sectional shape of the microlens 21 cut by a section in the X direction and the curvature radius Ry of a sectional shape of the microlens 21 cut by a section in the Y direction. In a case in which the surface shape of the microlens 21 is a spherical shape, Rx and Ry are the same value. On the other hand, in a case in which the surface shape of the microlens 21 is an aspherical shape having anisotropy, Rx and Ry may be different values.

The method of varying the curvature radii Rx and Ry of the microlenses 21 in the above-described initial disposition state at random is as follows, for example. First, constant reference values Rx_k and Ry_k (hereinafter referred to as reference curvature radii Rx_k and Ry_k) to be used as references for varying the curvature radii Rx and Ry in the X direction and the Y direction are set. Then, the reference curvature radii Rx_k and Ry_k are varied at random within ranges of predetermined varying rates δRx and δRy [%] to set the curvature radii Rx and Ry (Rx=Rx_k×(100±δRx [%]), Ry=Ry_k×(100±δRy [%])). This is repeated by the number of the respective microlenses 21 to respectively set curvature radii $Rx_{11}$, $Ry_{11}$, $Rx_{21}$, $Ry_{21}$, . . . , $Rx_{nm}$, and $Ry_{nm}$ in the X direction and the Y direction for the respective microlenses 21. Note that n indicates the number of the microlenses 21 disposed in the X direction, and m indicates the number of the microlenses 21 disposed in the Y direction.

Herein, the varying rates δRx and δRy preferably fall within the range of ±10% to ±50%. If the varying rates δRx and δRy are set to be less than ±10%, variations in the curvature radii Rx and Ry will be insufficient, which could make it difficult to provide the microlens array 20 with sufficient aperiodicity, and uniformity of diffused light through the microlens array 20 could be degraded. On the other hand, if the varying rates δRx and δRy are set to be more than ±50%, variations in the curvature radii Rx and Ry will become excessively large, which could make it difficult to continuously dispose the plurality of microlenses 21 on the X-Y plane with no gap.

In the foregoing manner, the curvature radii Rx and Ry of each of the microlenses 21 in the initial disposition state are varied at random (the first varied disposition state). As a result, the curvature radii Rx in the X direction of the microlenses 21 disposed in the X direction have values different from each other as shown in FIG. 6. Similarly, the curvature radii Ry in the Y direction of the microlenses 21 disposed in the Y direction have values different from each other. Describing in detail, the curvature radii Rx are varied at random at the varying rate δRx within the range of ±10% to ±50% using the reference curvature radius Rx_k as a reference. In addition, the curvature radii Ry are varied at random at the varying rate δRy within the range of ±10% to ±50% using the reference curvature radius Ry_k as a reference.

In the first varied disposition state, the planar shapes of the respective microlenses 21 have shapes shifted from the rectangles as shown in FIG. 6, and the contour lines of the planar shapes of the microlenses 21 may not agree with the grid lines 31 and 32 in the X direction and the Y direction. However, the position of the vertex 22 of each of the microlenses 21 agrees with the central point 23 of each of the rectangles. In addition, in the first varied disposition state, the aperture sizes Dx and Dy in the X direction and the Y direction of each of the microlenses 21 are shifted from the grid intervals Wx and WV in the X direction and the Y direction.

In this manner, in the first varied disposition state obtained by varying the curvature radii Rx and Ry of the microlenses 21 at random, the plurality of microlenses 21 can be arranged such that the aperture sizes Dx, Dy and the surface shapes of the microlenses 21 are further different from each other relative to those in the initial disposition state.

(3) Second Varied Disposition State of the Microlenses 21 Obtained by Varying Lens Vertex Positions (FIG. 7)

After setting the first varied disposition state as described above, a second varied disposition state obtained by off-centering the planar positions of the vertices 22 of the microlenses 21 at random from the central points 23 of the above-described rectangles is set as shown in FIG. 7. Herein, off-centering indicates varying the planar position of the vertex 22 of the microlens 21 to be shifted from the central point 23 of the rectangle on the X-Y plane. Note that the central point 23 of the rectangle is an intersection of two diagonal lines of the rectangle (see FIG. 4).

A method of off-centering the planar positions of the vertices 22 of the microlenses 21 in the above-described first varied disposition state at random is as follows, for example.

First, an off-centering amount Ec of the planar position of the vertex 22 of the microlens 21 (which hereinafter may be referred to as a lens vertex position 22) is set. The off-centering amount Ec is a shift amount (distance) of the lens vertex position 22 from the central point 23 of the rectangle. The off-centering amount Ec is expressed by an off-centering amount Ecx in the X direction and an off-centering amount Ecy in the Y direction. The off-centering amount Ecx is a shift amount of the lens vertex position 22 in the X direction from the central point 23 of the rectangle, and the off-centering amount Ecy is a shift amount of the lens vertex position 22 in the Y direction from the central point 23 of the rectangle.

Then, off-centering rates δEcx and δEcy in the X direction and the Y direction are set. The off-centering rate δEcx in the X direction is a proportion (percentage) of the off-centering amount Ecx with respect to the grid interval Wx of the above-described rectangle. The off-centering rate δEcy in the Y direction is a proportion (percentage) of the off-centering amount Ecy with respect to the grid interval Wy of the above-described rectangle. The off-centering rates δEcx and δEcy are expressed by the following expressions.

$$\delta Ecx[\%]=Ecx/Wx\times 100$$

$$\delta Ecy[\%]=Ecy/Wy\times 100$$

Then, the lens vertex position is off-centered based on the off-centering rates δEcx and δEcy set as described above. Describing in detail, the lens vertex position 22 of each of the microlenses 21 is off-centered at random at the off-centering rates δEcx and δEcy within ±10% to ±50%.

Herein, the off-centering rates δEcx and δEcy preferably fall within the range of ±10% to ±50%. If the off-centering rates δEcx and δEcy are set to be less than ±10%, the off-centering amounts Ecx and Ecy of the lens vertex position 22 will be insufficient, which could make it difficult to provide the microlens array 20 with sufficient aperiodicity, and uniformity of diffused light in the X direction and the Y direction through the microlens array 20 could be degraded. On the other hand, if the off-centering rates δEcx and δEcy are set to be more than ±50%, the off-centering amounts Ecx and Ecy of the lens vertex will be excessively large, which could make it difficult to continuously dispose the plurality of microlenses 21 on the X-Y plane with no gap.

In the foregoing manner, the planar position of the vertex 22 of each of the microlenses 21 in the first varied disposition state is varied at random from the central point 23 of the rectangle (the second varied disposition state). As a result, as shown in FIG. 7, the planar positions of the vertices 22 of the respective microlenses 21 are shifted in random directions on the X-Y plane by the random off-centering amounts Ecx and Ecy.

As a result, in the second varied disposition state, the planar shapes of the respective microlenses 21 have shapes shifted from the rectangular shapes corresponding to the rectangles further than in the above-described first varied disposition state (see FIG. 6), as shown in FIG. 4 and FIG. 7. In addition, in the second varied disposition state, the aperture sizes Dx and Dy in the X direction and the Y direction of each of the microlenses 21 are shifted further from the grid intervals Wx and Wy in the X direction and the Y direction.

In this manner, in the second varied disposition state obtained by off-centering the planar positions of the vertices 22 of the microlenses 21 at random, the plurality of microlenses 21 can be arranged such that the surface shapes and the aperture sizes Dx, Dy of the microlenses 21 are different from each other further than in the first varied disposition state.

In addition, in the above-described second varied disposition state, the height positions of the vertices 22 of the plurality of microlenses 21 (the positions in the thickness direction of the diffuser plate 1) are varied from each other. Describing in detail, as shown in FIG. 2, the height positions of the vertices 22 of the plurality of microlenses 21 (the deepest points of concave lenses) disposed in the X direction are different from each other, and the height positions of the vertices 22 of the plurality of microlenses 21 (the deepest points of concave lenses) disposed in the Y direction are also different from each other. This can further increase randomness of the shapes and arrangement of the plurality of microlenses 21 to provide the microlens array 20 with sufficient aperiodicity.

In the foregoing manner, the method of arranging the microlenses 21 according to the present embodiment first disposes the plurality of microlenses 21 quasi-regularly using the irregular rectangular grid having the grid intervals Wx and Wy different from each other as a reference (the initial disposition state: FIG. 5). The microlenses 21 are thereby disposed quasi-regularly in the X-Y plane in such a manner that the contour lines of the planar shapes of the respective microlenses 21 agree with the grid lines 31 and 32 of the irregular rectangular grid.

Thereafter, the curvature radii Rx and Ry, the surface shapes, and the lens vertex positions 22 of the plurality of microlenses 21 having been disposed are varied at random (the first and second varied disposition states: FIG. 6 and FIG. 7). The surface shapes (stereoscopic shapes), the aperture shapes (planar shapes), the aperture sizes Dx, Dy, the arrangement, and the like of the microlenses 21 disposed quasi-regularly can thereby be varied at random. This enables a highly-random three-dimensional surface structure of the microlens array 20 to be achieved while achieving the quasi-regular disposition of the microlenses 21.

Therefore, the microlens array 20 according to the present embodiment enables an overlapping state of phases of light emitted from the respective microlenses 21 to be controlled appropriately. This can appropriately reduce interference of diffused light from the respective microlenses 21 and diffraction due to a periodic structure of the microlens array. Thus, unevenness in intensity distribution of diffused light can be reduced to improve uniformity of light distribution in the X and Y directions orthogonal to each other. Furthermore, anisotropy of light distribution in the X and Y directions and a cut-off property of intensity distribution of diffused light can also be controlled.

Note that the cut-off property indicates that diffused light from the microlens array 20 has what is called a top hat diffusion property. The top hat diffusion property refers to an optical function that, with respect to collimated light in a visible light region or telecentric light having a principal ray with a collimating property and having a certain aperture, uniformity of energy distribution is very high within an angular component in a certain region, and if the certain region of this angular component is exceeded, energy may be reduced abruptly. When the top hat diffusion property is achieved, a luminance distribution of diffused light of light incident on the microlens array 20 becomes generally even within the range of predetermined diffusion angles, and within the range of the predetermined diffusion angles, a state is achieved in which a luminance value of diffused light falls within the range of ±20%, for example, centering on an average value of peak levels.

With the microlens array 20 according to the present embodiment, the plurality of microlenses 21 are disposed in the form of a rectangular grid by the above-described arrangement method, the curvature radii Rx, Ry, the lens vertex position 22, and the like of each of the microlenses 21 are controlled properly, and aspherical shapes are introduced into the surface shapes of the microlenses 21. This can achieve a desired diffusion property of the microlens array 20, so that the top hat diffusion property can be achieved more reliably.

Furthermore, according to the present embodiment, upon disposing the plurality of microlenses 21 quasi-regularly on the X-Y plane (the initial disposition state) using the irregular rectangular grid having the grid intervals Wx and Wy different from each other as a reference, the curvature radii Rx, Ry and the lens vertex positions 22 are varied (the first and second varied disposition states). This enables the plurality of microlenses 21 to be arranged continuously with no gap between each other on the surface of the diffuser plate 1 while ensuring randomness of the surface shapes of the respective microlenses 21. Therefore, a flat portion can be prevented from existing at the boundary portion between the microlenses 21 adjacent to each other, so that a component (0-th order transmitted light component) of incident light that is transmitted as it is without scattering on the surface of the diffuser plate can be reduced. As a result, uniformity of light distribution in the X and Y directions orthogonal to each other and diffusion performance can be improved further.

<5. Examples of Aspherical Shape of Microlenses>

Examples in which the surface shapes of the microlenses 21 according to the present embodiment are aspherical shapes having anisotropy will now be described.

In the present embodiment, the plurality of microlenses 21 having anisotropy in a common direction may be disposed in the form of a rectangular grid all over the microlens array 20. The microlenses 21 having anisotropy are microlenses each having a planar shape whose length in one direction (longitudinal direction) is longer than the length in the other direction (shorter side direction) orthogonal to the one direction, for example. The plurality of microlenses 21 having anisotropy are disposed on the X-Y plane of the base material 10 such that the longitudinal direction of each of the microlenses 21 is directed to the same direction.

This enables an anisotropic shape of diffused light on a projection surface to be controlled. For example, on the diffuser plate 1, a diffusion width of light in the longitudinal direction of the microlenses 21 is reduced, and a diffusion width of light in the shorter side direction is increased. This enables the anisotropic shape of light diffused by the diffuser plate 1 to be controlled in accordance with the shape of the projection surface.

Hereinafter, a case in which the surface shapes (three-dimensional stereoscopic shapes) of the individual microlenses 21 are aspherical shapes having anisotropy will be described in more detail with reference to FIG. 8 to FIG. 13. The microlenses 21 have aspherical shapes having anisotropy extended in a predetermined direction. As these aspherical shapes, a first aspherical shape example (anamorphic shape) or a second aspherical shape example (toric shape) which will be described below, or the like, for example, can be used.

(1) First Aspherical Shape Example (Anamorphic Shape)

Figure 8:
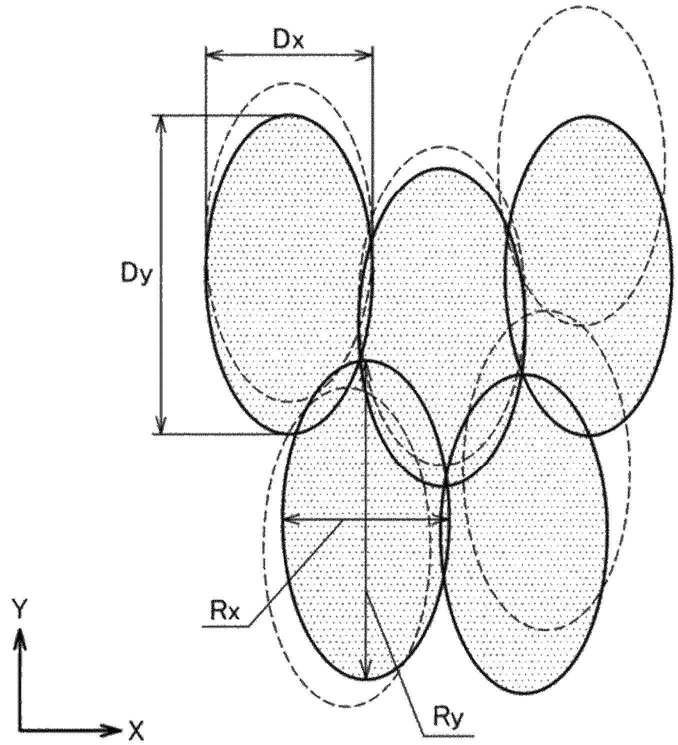
FIG. 8 is an explanatory diagram showing planar shapes of microlenses having anamorphic shapes according to the embodiment.
Figure 9:
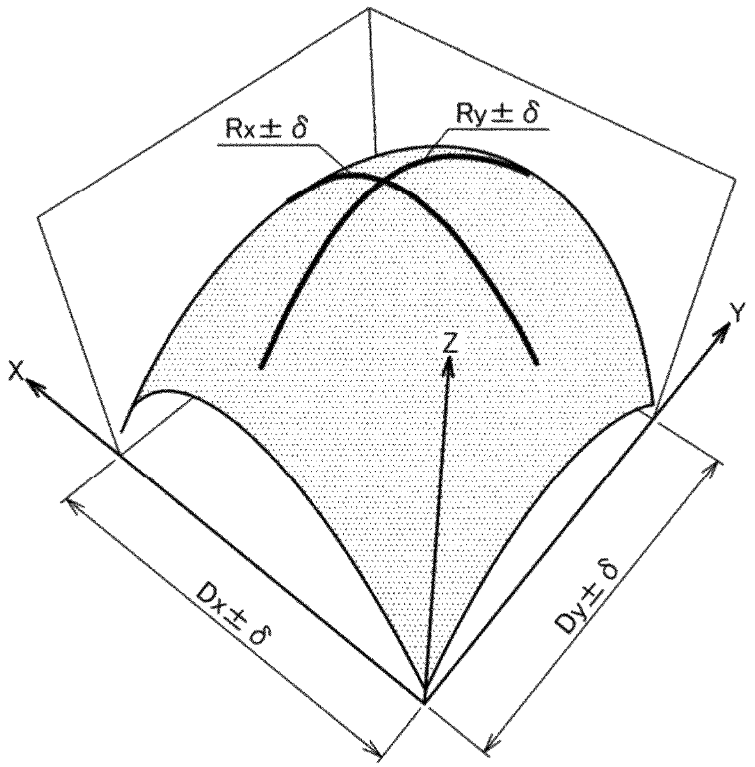
FIG. 9 is a perspective view showing a stereoscopic shape of the microlens having the anamorphic shape according to the embodiment.
Figure 10:
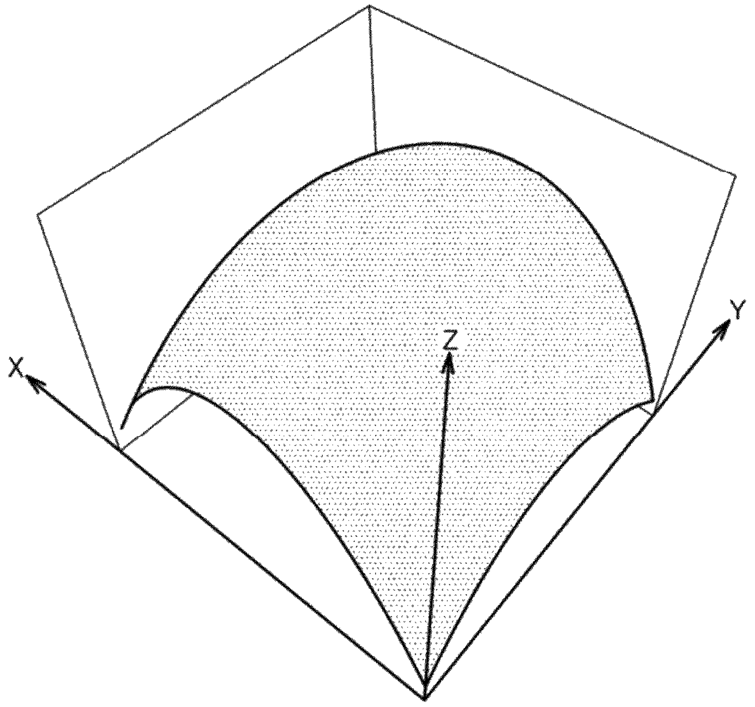
FIG. 10 is a perspective view showing a curved surface of the anamorphic shape according to the embodiment.

First, an example of aspherical shapes (anamorphic shapes) of the microlenses 21 will be described with reference to FIG. 8 to FIG. 10. FIG. 8 is an explanatory diagram showing planar shapes of the microlenses 21 having anamorphic shapes. FIG. 9 is a perspective view showing a stereoscopic shape of the microlens 21 having the anamorphic shape. FIG. 10 is a perspective view showing a curved surface having the anamorphic shape The microlenses 21 shown in FIG. 8 and FIG. 9 are what is called anamorphic lenses, whose surface shapes are aspherical shapes including curved surfaces having anamorphic shapes. As shown in FIG. 8, the planar shapes of the microlenses 21 are elliptical shapes having anisotropy. The longer diameter of the elliptical shape in the Y-axis direction is Dy, and the shorter diameter in the X-axis direction is Dx, Dx and Dy are equivalent to the aperture sizes of the microlens 21 in the X direction and the Y direction. As shown in FIG. 9, the stereoscopic shape of the microlens 21 consists of an aspherical curved surface having the predetermined curvature radii Rx and Ry in the longer axis direction and the shorter axis direction of the elliptical shape, respectively. The microlens 21 has an aspherical shape having anisotropy in the Y-axis direction.

Herein, a method of setting the surface shape of the microlens 21 having the anamorphic shape will be described with reference to FIG. 10 and Expression (1) below. FIG. 10 is a perspective view showing a curved surface (aspherical surface) having the anamorphic shape expressed by Expression (1) below. Expression (1) below is an example of an expression that expresses the curved surface (aspherical surface) having the anamorphic shape.

[Ex. 1]

$$Z = \frac{C_x x^2 + C_y y^2}{1 + \sqrt{1 - (1 + K_x)C_x^2 x^2 - (1 + K_y)C_y^2 y^2}} + A_{x4}x^4 + A_{y4}y^4 + A_{x6}x^6 + A_{y6}y^6 \quad (1)$$

Note that Expression 1 includes the following respective parameters.

$Cx=1/Rx$ $Cy=1/Ry$

Rx: curvature radius in the X direction

Ry: curvature radius in the Y direction

Kx: conic constant in the X direction

Ky: conic constant in the Y direction $A_{x4}$, $A_{x6}$: fourth and sixth aspherical coefficients in the X direction $A_{y4}$, $A_{y6}$: fourth and sixth aspherical coefficients in the Y direction As shown in FIG. 10, a curved surface is cut out from the curved surface having the anamorphic shape defined by Expression (1) above such that the shorter diameter in the X direction of the elliptical shape on the X-Y plane is Dx and the longer diameter in the Y direction is Dy. This cut-out partial curved surface shape is set as the curved surface shape (anamorphic shape) of the microlens 21. Herein, the longer diameter Dy, the shorter diameter Dx, the curvature radius Ry in the Y direction (longer axis direction), and the curvature radius Rx in the X direction (shorter axis direction) of the elliptical shape are varied for each of the microlenses 21 at random within ranges of the predetermined varying rates S. The surface shapes of the plurality of microlenses 21 consisting of anamorphic shapes different from each other can thereby be set.

(2) Second Aspherical Shape Example (Toric Shape)

Figure 11:
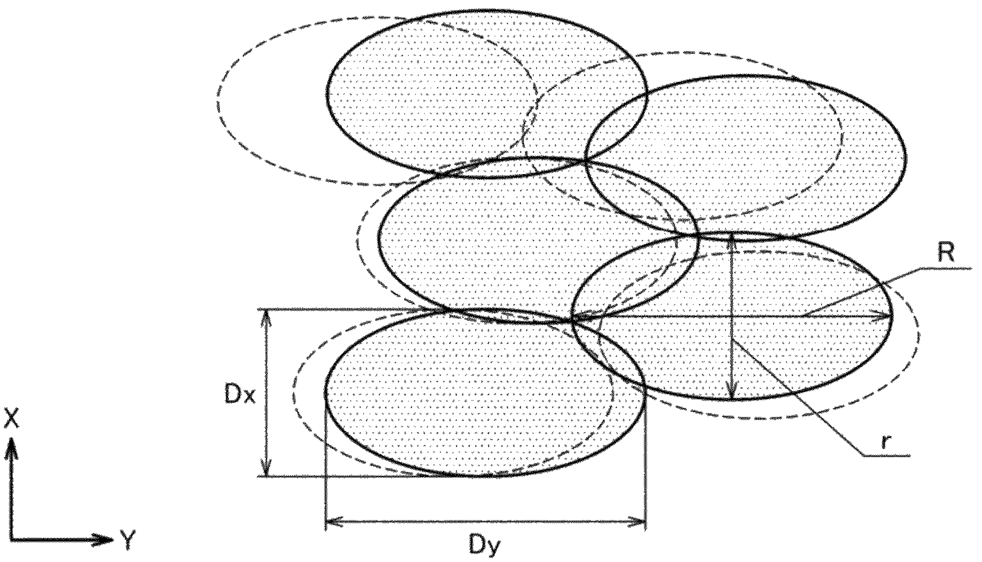
FIG. 11 is an explanatory diagram showing planar shapes of microlenses having toric shapes according to the embodiment.
Figure 12:
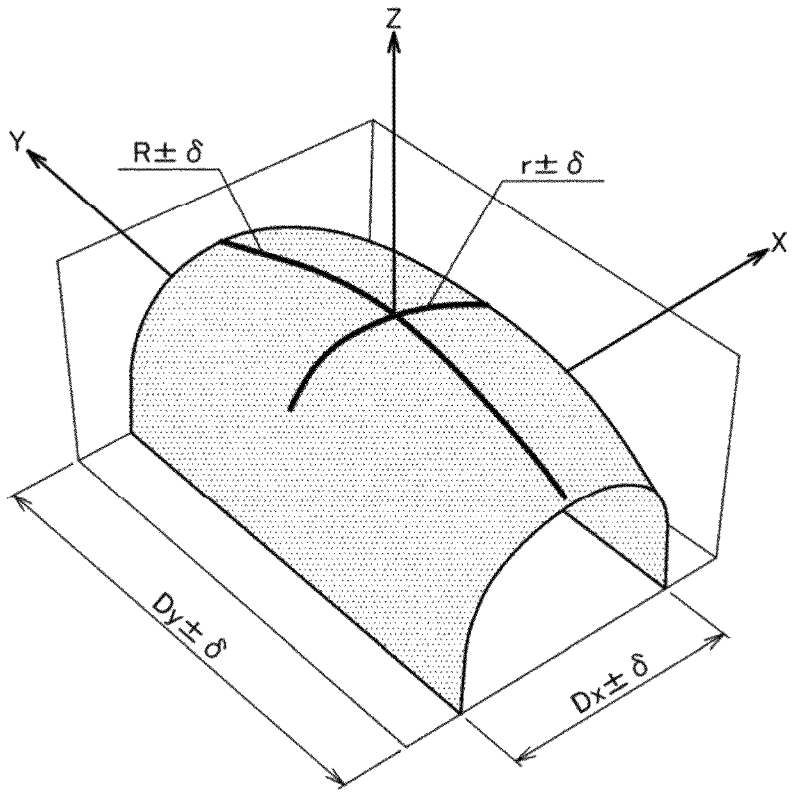
FIG. 12 is a perspective view showing a stereoscopic shape of the microlens having the toric shape according to the embodiment.
Figure 13:
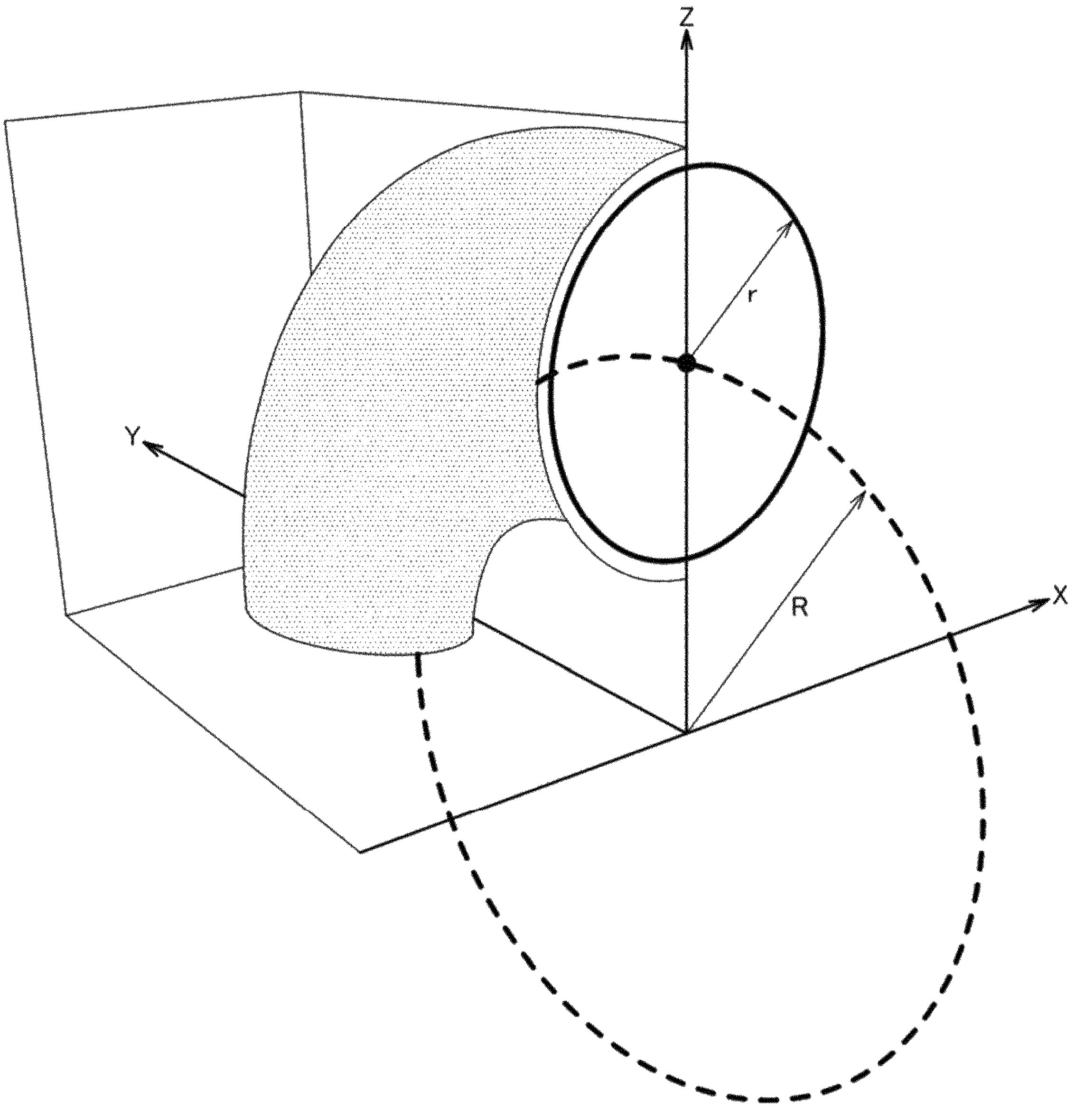
FIG. 13 is a perspective view showing a curved surface of the toric shape according to the embodiment.

Another example of aspherical shapes (toric shapes) of the microlenses 21 will now be described with reference to FIG. 11 to FIG. 13. FIG. 11 is an explanatory diagram showing planar shapes of the microlenses 21 having toric shapes. FIG. 12 is a perspective view showing a stereoscopic shape of the microlens 21 having the toric shape. FIG. 13 is a perspective view showing a curved surface having the toric shape.

As shown in FIG. 11 to FIG. 13, the surface shapes of the microlenses 21 according to the second aspherical shape example are aspherical shapes including curved surfaces of part of toric shapes. A torus is a surface of revolution obtained by revolving a circle. Specifically, as shown in FIG. 13, centering on an axis of revolution (the X-axis) arranged outside a smaller circle (radius: r), the smaller circle is revolved along the circumference of a larger circle (radius. R) to obtain what is called a doughnut-shaped torus. A curved surface shape of the surface (toric surface) of this torus is the toric shape. By cutting out an outer portion of this toric shape, the stereoscopic shape of the microlens 21 having the toric shape as shown in FIG. 12 is obtained.

As shown in FIG. 11, the planar shapes of the microlenses 21 having the toric shapes are elliptical shapes having anisotropy. The longer diameter in the Y-axis direction of the elliptical shape is R, and the shorter diameter in the X-axis direction is r. These r and R are equivalent to the aperture sizes Dx and Dy of the microlenses 21 in the X direction and the Y direction. As shown in FIG. 12, the stereoscopic shape of the microlens 21 consists of an aspherical curved surface having predetermined curvature radii R and r in the longer axis direction and the shorter axis direction of the elliptical shape respectively. The microlens 21 has an aspherical shape having anisotropy in the Y-axis direction.

Herein, a method of setting the surface shape of the microlens 21 having the toric shape will be described with reference to FIG. 13 and Expression (2) below. FIG. 13 is a perspective view showing an aspherical curved surface expressed by Expression (2) below. Note that in Expression 2, R indicates the larger circle radius, and r indicates the smaller circle radius.

[Ex. 2]

$$Z = \sqrt{\left(R \pm \sqrt{r^2 - x^2}\right)^2 - y^2} \quad (2)$$

As shown in FIG. 13, a curved surface is cut out from the curved surface having the toric shape defined by Expression (2) above such that the shorter diameter in the X direction of the elliptical shape on the X-Y plane is r and the longer diameter in the Y direction is R. This cut-out partial curved surface shape is set as the curved surface shape (toric shape) of the microlens 21. Herein, the longer diameter Dy, the shorter diameter Dx, the curvature radius R in the Y direction (longer axis direction) (equivalent to the curvature radius Ry of the lens), and the curvature radius r (equivalent to the curvature radius Rx of the lens) in the X direction (shorter axis direction) of the elliptical shape are varied for each of the microlenses 21 at random within the ranges of the predetermined varying rates S. The surface shapes of the plurality of microlenses 21 consisting of toric shapes different from each other can thereby be set.

Note that, as the surface shapes (aspherical shapes having anisotropy) of the microlenses 21 according to the present embodiment, aspherical shapes cut out from spheroids, for example, can be used besides the above-described first and second aspherical shape examples.

<6. Method of Designing Microlenses>

Figure 14:
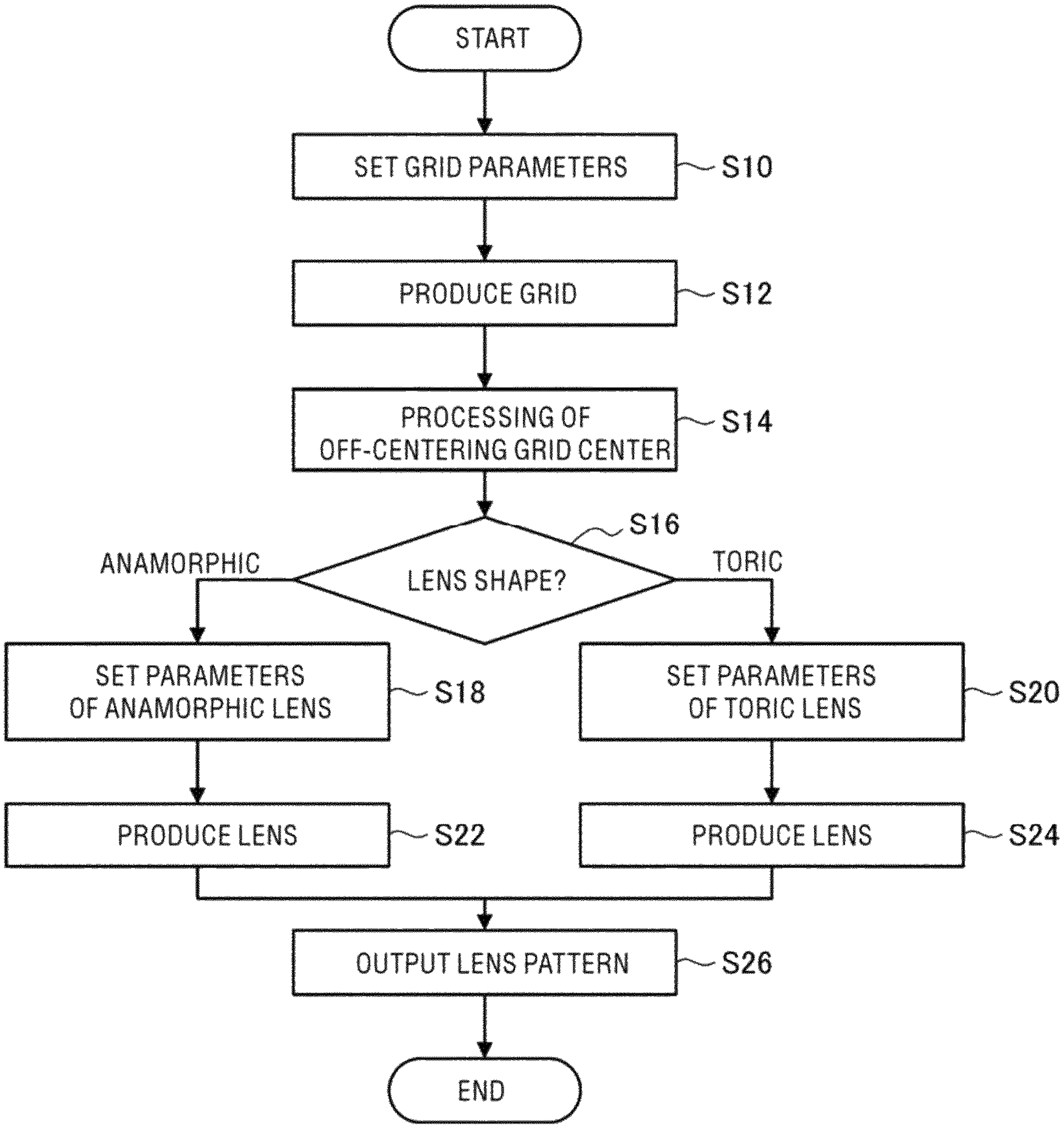
FIG. 14 is a flowchart showing a method of designing the microlenses according to the embodiment.

A method of designing microlenses according to the present embodiment will now be described with reference to FIG. 14 to FIG. 18. FIG. 14 is a flowchart showing the method of designing microlenses according to the present embodiment.

(S10) Setting of Grid Parameters

As shown in FIG. 14, first, various parameters (grid parameters) concerning a rectangular grid (grid) to be used as a reference for disposing the plurality of microlenses 21 on the X-Y plane are set (S10). The grid parameters include the following parameters, for example.

Wx_k [μm]: reference value for the grid intervals Wx in the X direction (grid size in the X direction)

Wy_k [μm]: reference value for the grid intervals Wy in the Y direction (grid size in the Y direction)

δWx [±%]: varying rate of the grid intervals Wx in the X direction (allowable varying range of Wx in the X direction)

δWy [±%]: varying rate of the grid intervals Wy in the Y direction (allowable varying range of Wy in the Y direction)

δEcx [±%]: off-centering rate of the lens vertex position in the X direction (off-centering range in the X direction)

δEcy [±%]: off-centering rate of the lens vertex position in the Y direction (off-centering range in the Y direction)

Specifically, set values of the grid parameters can be set at the following numeric values, for example.

Wx_k: 120 μm

Wy_k: 90 μm

δWx: ±20%

δWy: ±10%

δEcx: ±10%

δEcy: ±10%

(S12) Production of Grid

Figure 15:
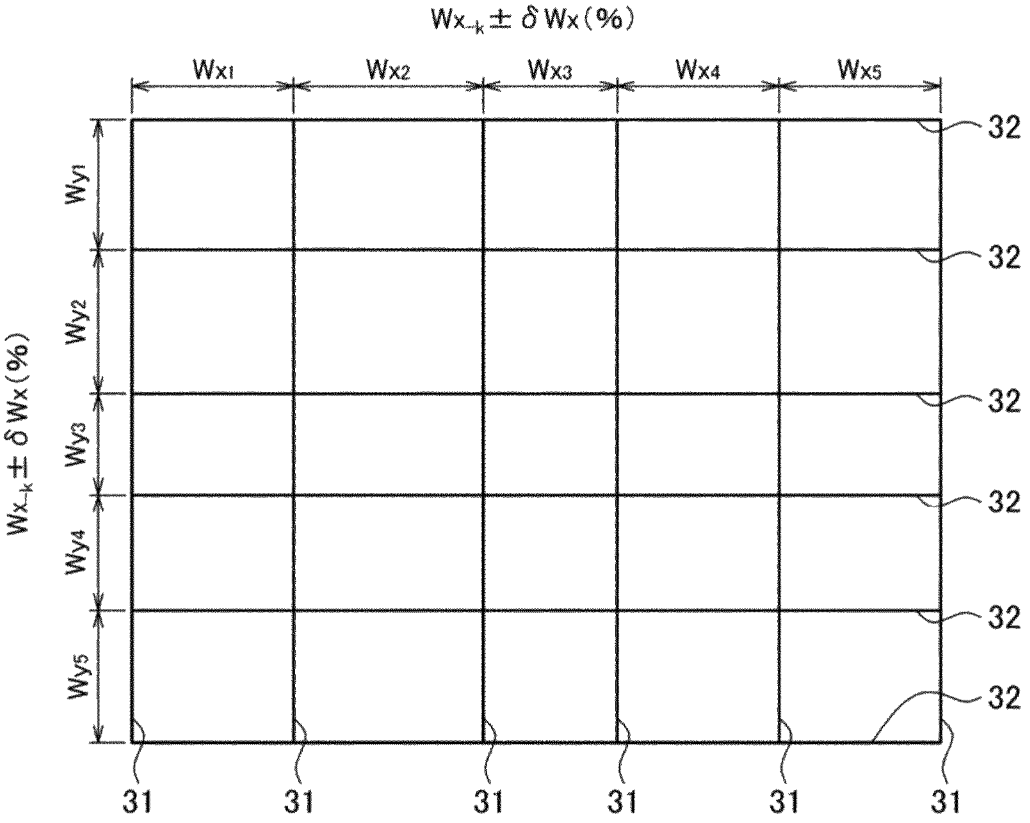
FIG. 15 is an explanatory diagram showing a rectangular grid produced in a grid producing step according to the embodiment.

Then, a plurality of rectangles disposed in the X and Y directions are produced on the basis of the grid parameters set in S10 (S12). FIG. 15 is an explanatory diagram showing the rectangles produced in the present step S12. As shown in FIG. 15, an irregular rectangular grid obtained by varying the grid intervals Wx and Wy in the X and Y directions at random is set. The grid interval Wx in the X direction is an interval between the grid lines 31 adjacent to each other in the X direction. The grid interval Wy in the Y direction is an interval between the grid lines 32 adjacent to each other in the Y direction.

The grid intervals Wx in the X direction are set at values obtained by varying the reference grid interval Wx_k [μm] at random at the varying rate δWx [±%]. Similarly, the grid intervals Wy in the Y direction are set at values obtained by varying the reference grid interval Wy_k [μm] at random at the varying rate δWy [±%]. For example, in a case in which the set values of the grid parameters are numeric values in the above-described specific example (Wx_k=120 μm, δWx=±20%), the grid intervals Wx are set at random values within the range of 96 μm to 144 μm (values of 80% to 120% of 120 μm) centering on 120 μm (Wx_k). The grid intervals Wy are also set similarly. As a result, as shown in FIG. 15, the grid intervals Wx and Wy of the plurality of rectangles disposed in the X and Y directions are set at values different from each other.

(S14) Processing of Off-Centering Grid Center

Figure 16:
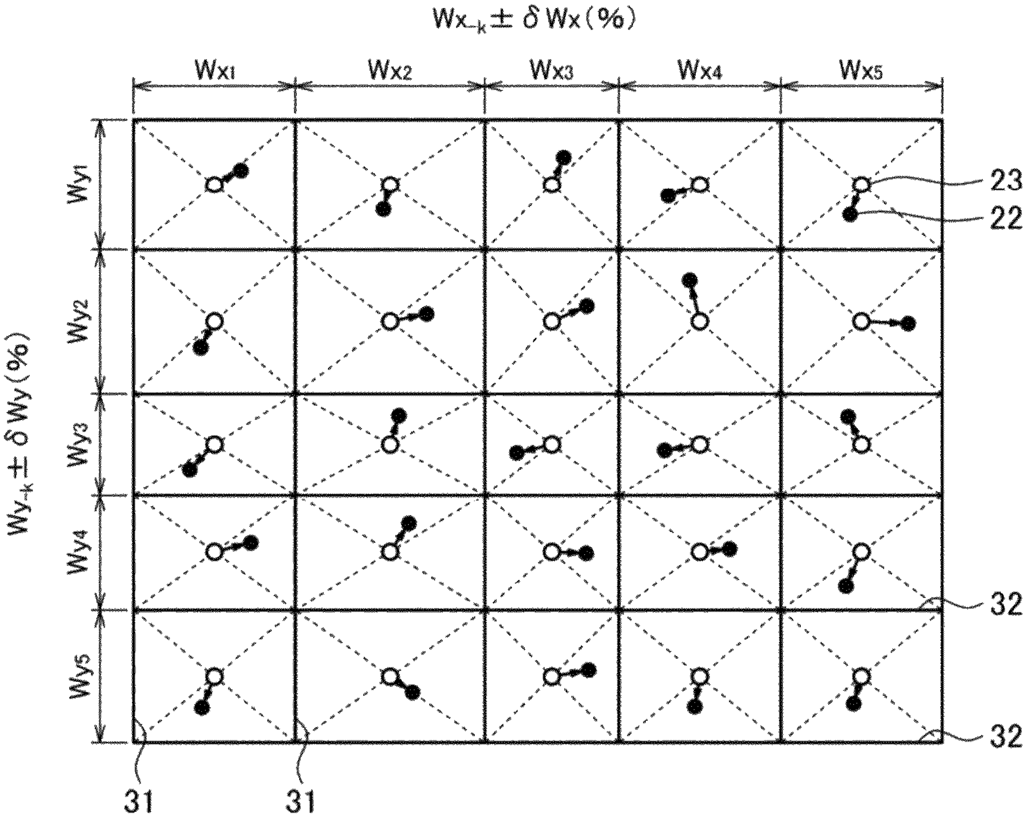
FIG. 16 is an explanatory diagram showing a rectangular grid produced in a grid off-centering step according to the embodiment.

Thereafter, off-centering processing of varying the position of a central point (hereinafter referred to as a "grid center") of each of the rectangles at random is executed (S14). FIG. 16 is an explanatory diagram showing a rectangular grid obtained by off-centering the grid centers in the present step S14.

As shown in FIG. 16, the grid center before the off-centering processing is arranged at a coordinate position of the intersection of two diagonal lines of each of the rectangles (the central point 23 of each of the rectangles described earlier). Through the off-centering processing, the grid center is moved to an X and Y coordinate position corresponding to the off-centering amounts Ecx and Ecy calculated at random using the off-centering rate δEcx and the off-centering rate δEcy. For example, in a case in which set values of the grid parameters are numeric values in the above-described specific example (δEcx=±10%, δEcy=±10%), the off-centering amounts Ecx and Ecy are set at values within the range of 90% to 110% of the grid intervals Wx and Wy, respectively. Then, the grid center is moved in the X direction and the Y direction by distances equivalent to these off-centering amounts Ecx and Ecy. The position of the grid center after being moved is equivalent to the planar position of the vertex 22 of the microlens 21 (the lens vertex position 22) described earlier. By repeating this off-centering processing for each of the rectangles, the grid center of each of the rectangles is off-centered to a random position in each of the rectangles within the ranges of the off-centering rate δEcx and the off-centering rate δEcy.

(S16 to S24) Production of Microlenses

Then, on the basis of the rectangles produced in S12 above and the grid centers off-centered in S14, the microlenses 21 corresponding to the respective rectangles are arranged. Specifically, a basic shape of the surface shapes (lens surfaces) of the microlenses 21 is selected first (S16). Then, parameters (lens parameters) concerning the selected basic shape are set (S18, S20). Thereafter, on the basis of the set lens parameters, the shape of the microlens 21 in each of the rectangles is determined, and a Z coordinate position representing the shape of the microlens 21 is computed to produce the microlens 21 (S22, S24).

Specifically, in the present embodiment, an anamorphic shape or a toric shape is selected, for example as the basic shape of the microlenses 21 (hereinafter referred to as a lens shape) (S16). However, this is not a limitation, and another type of aspherical shape or spherical shape may be selected as the lens shape.

In a case in which the anamorphic shape is selected in S16, various lens parameters concerning the anamorphic shape are set (S18). The lens parameters of the anamorphic shape include the following parameters, for example.

Rx_k [μm]: reference value for the curvature radius Rx in the X direction

Ry_k [μm]: reference value for the curvature radius Ry in the Y direction

δRx [±%]: varying rate of the curvature radius Rx in the X direction (allowable varying range of Rx in the X direction)

δRy [±%]: varying rate of the curvature radius Ry in the Y direction (allowable varying range of Ry in the Y direction)

Specifically, set values of the lens parameters of the anamorphic shape can be set at the following numeric values, for example.

Rx_k: 240 μm

Ry_k: 200 μm

*δRx*: ±10%

*δRy*: ±10%

Then, on the basis of the lens parameters set in S18, the surface shape of the microlens 21 having the anamorphic shape is produced (S22). Describing in detail, on the basis of the lens parameters, the surface shape of each of the microlenses 21 is determined, and each of the microlenses 21 is disposed on each of the rectangles. In other words, the Z coordinate value of each point of the lens surface having the anamorphic shape is computed.

Figure 17:
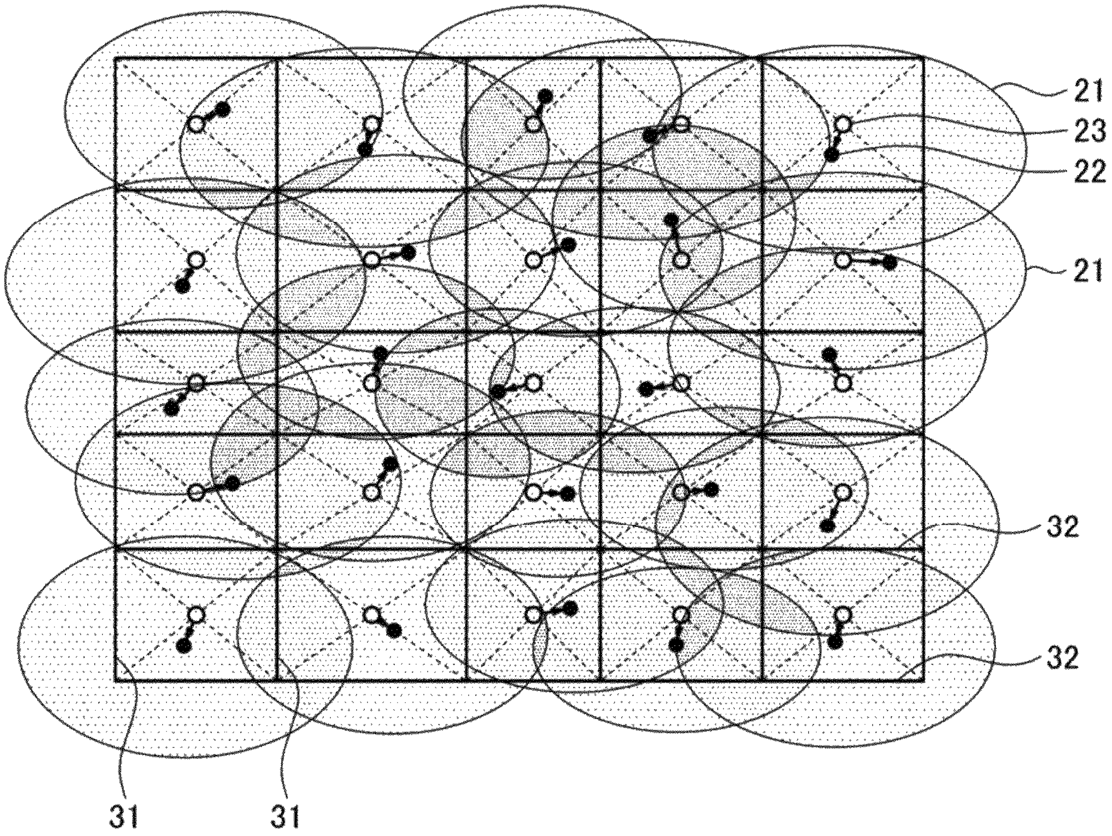
FIG. 17 is an explanatory diagram showing a plurality of microlenses produced in a lens producing step according to the embodiment.

FIG. 17 is an explanatory diagram showing the plurality of microlenses 21 produced in the present step S22. As shown in FIG. 17, each of the microlenses 21 is disposed on each of the rectangles such that the lens vertex position 22 agrees with the grid center position off-centered in S14. In addition, the curvature radii Rx and Ry of each of the microlenses 21 in the X and Y directions have been varied at random. The plurality of microlenses 21 having surface shapes (anamorphic shapes) different from each other are thereby disposed on the X-Y plane in a manner overlapping each other.

The curvature radius Rx in the X direction is set at a value obtained by varying the reference curvature radius Rx_k [μm] at random at the varying rate δRx [±%]. Similarly, the curvature radius Ry in the Y direction is set at a value obtained by varying the reference curvature radius Ry_k [μm] at random at the varying rate δRy [±%]. For example, in a case in which set values of the lens parameters are numeric values in the above-described specific example (Rx_k=240 μm, δRx=±10%), the curvature radius Rx is set at a random value within the range of 216 μm to 264 μm (a value of 90% to 110% of 240 μm) centering on 240 μm (Rx_k). The curvature radius Ry is also set similarly. As a result, as shown in FIG. 17, the surface shapes (anamorphic shapes) of the plurality of microlenses 21 disposed in the X and Y directions become shapes different from each other.

On the other hand, in a case in which the toric shape is selected in S16 above, various lens parameters concerning the toric shape are set (S20). The lens parameters of the toric shape include the following parameters, for example. Note that the smaller circle radius r and the larger circle radius R are curvature radii that define the toric shape shown in FIG. 11 to FIG. 13.

r_k [μm]: reference value for the smaller circle radius (the curvature radius Rx in the X direction)

R_k [μm]: reference value for the larger circle radius (the curvature radius Ry in the Y direction)

δRx [±%]: varying rate (allowable varying range of r in the X direction) of the smaller circle radius (the curvature radius Rx in the X direction)

δRy [±%]: varying rate (allowable varying range of R in the Y direction) of the larger circle radius (the curvature radius Ry in the Y direction)

Specifically, the set values of the lens parameters of the toric shape can be set at the following numeric values, for example.

Rx_k: 240 μm

Ry_k: 200 μm

*δRx*: ±10%

*δRy*: ±10%

Then, on the basis of the lens parameters set in S20, the surface shape of the microlens 21 having the toric shape is produced (S24). Describing in detail, the surface shape of each of the microlenses 21 is determined on the basis of the lens parameters, and each of the microlenses 21 is disposed on each of the rectangles. In other words, the Z coordinate value of each point of the lens surface having the toric shape is computed. The toric lens production processing in the present step S24 is similar to the anamorphic lens production processing in S22 above, and a detailed description is omitted.

(S26) Output of Lens Pattern

Thereafter, a lens pattern representing the shapes and arrangement of the microlenses 21 produced in S20 or S24 above is output (S26). For example, a file of XYZ coordinate values representing the lens pattern and an image file expressing the Z coordinate values of the lens pattern by grayscale gradation are output.

Figure 18:
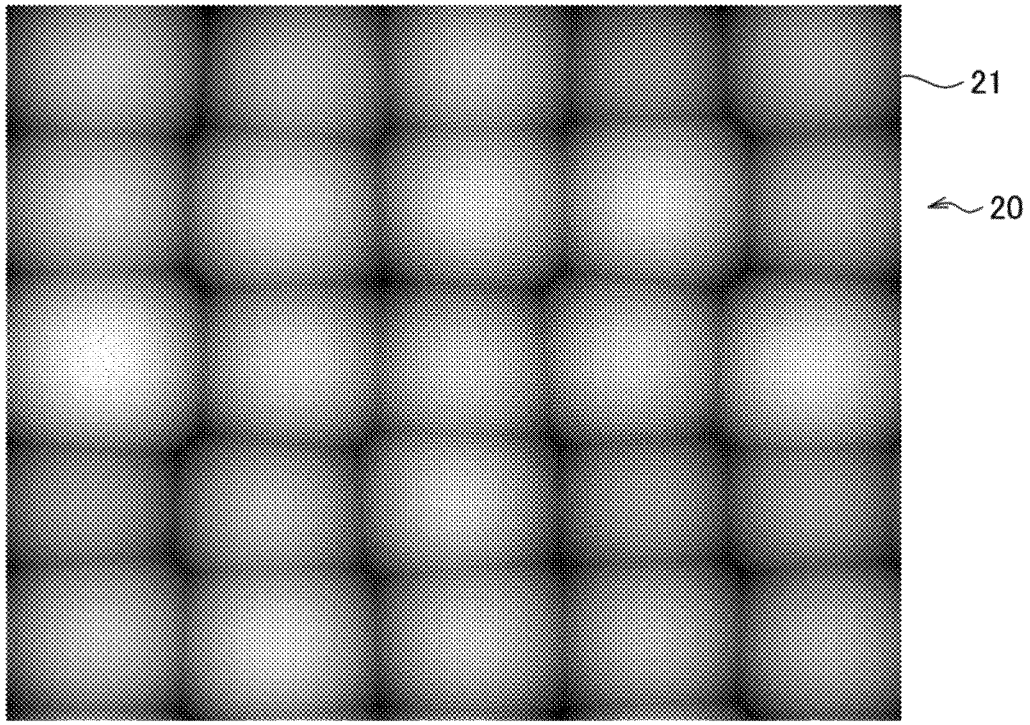
FIG. 18 is an image representing a lens pattern designed by the designing method according to the embodiment.

FIG. 18 is an image representing a lens pattern designed by the designing method according to the present embodiment. As shown in FIG. 18, the plurality of microlenses 21 are disposed on the X-Y plane in the form of an irregular rectangular grid. The lens vertex position 22 of each of the microlenses 21 is off-centered at random, and the curvature radii Rx and Ry of each of the microlenses 21 are also vaned at random.

It is therefore appreciated that the plurality of microlenses 21 have aspherical shapes (for example, anamorphic shapes or toric shapes) different from each other. In addition, the plurality of microlenses 21 have planar shapes different from each other. The planar shapes of the respective microlenses 21 schematically have generally rectangular shapes along the above-described rectangles, but are shapes varied individually. The four side portions of the boundary line between the microlenses 21 are substantially composed of straight lines, whereas the four corner portions are composed of curves.

Furthermore, the plurality of microlenses 21 are arranged so as to overlap each other with no gap between each other, and a flat portion does not exist at the boundary portion between the microlenses 21 adjacent to each other.

In the foregoing manner, by the method of designing the microlenses 21 according to the present embodiment, the plurality of microlenses 21 are arranged quasi-regularly using the aforementioned irregular rectangular grid as a reference, and the respective varying elements (such as the grid intervals Wx, Wy, the curvature radii Rx, Ry, and the lens vertex position 22) of the microlenses 21 are varied at random. This can provide the respective microlenses 21 with diffusion properties different from each other while disposing a plurality of the microlens arrays 20 on the X-Y plane continuously with no gap between each other. The microlens array having such a configuration has various light distribution control properties in which variations in macroscopic light amount depending on the lens surface structure and changes in light amount due to diffracted light are small, and uniformity is high.

<7. Method of Manufacturing Microlenses>

Figure 19:
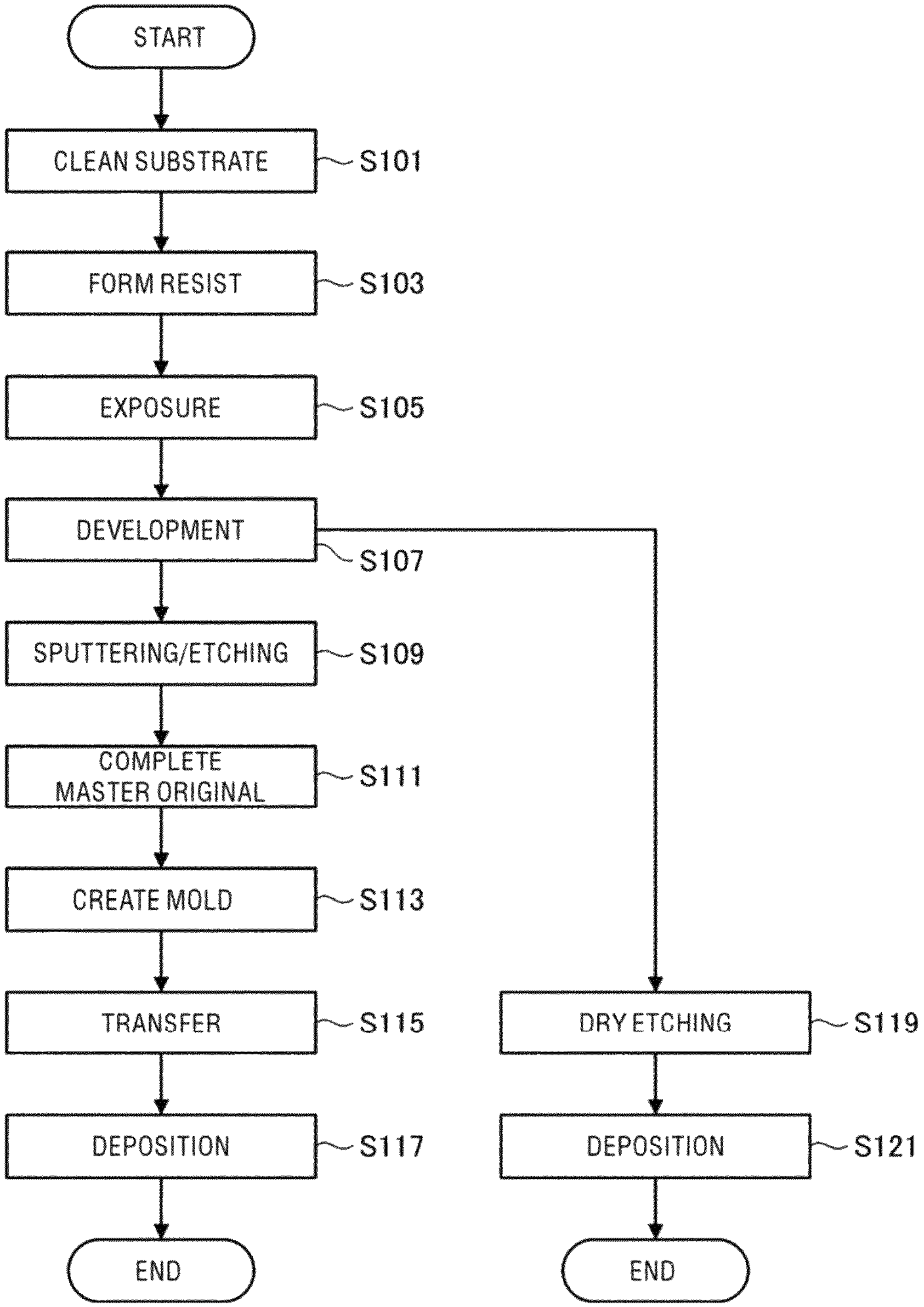
FIG. 19 is a flowchart showing a method of manufacturing the diffuser plate according to the embodiment.
Figure 20:
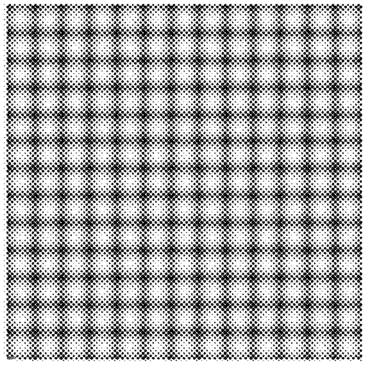
FIG. 20 is an explanatory diagram concerning a diffuser plate according to Comparative Example 1.
Figure 20:
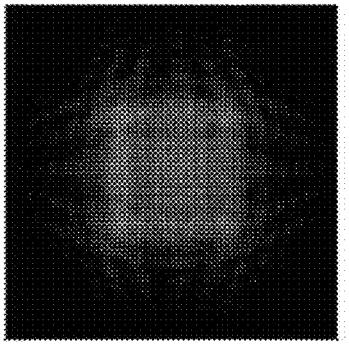
Figure 20:
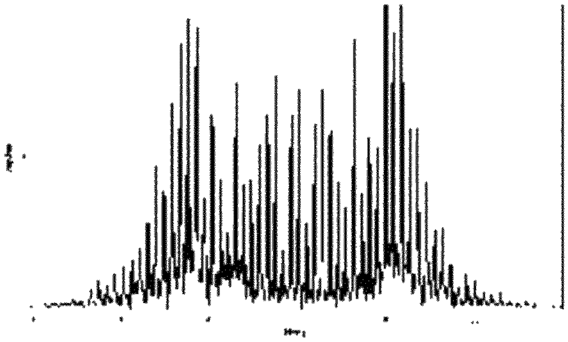
Figure 21:
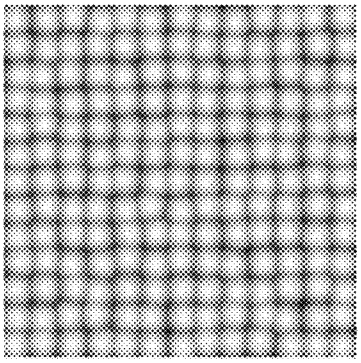
FIG. 21 is an explanatory diagram concerning a diffuser plate according to Comparative Example 2.
Figure 21:
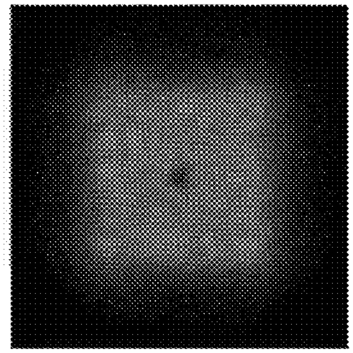
Figure 21:
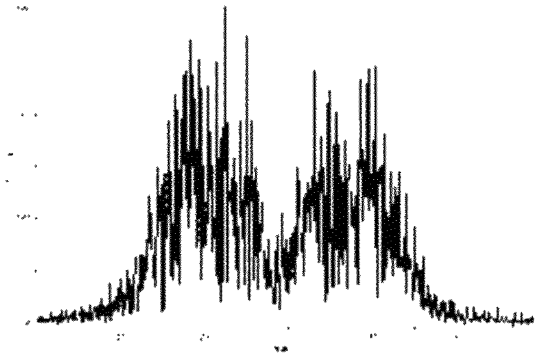
Figure 22:
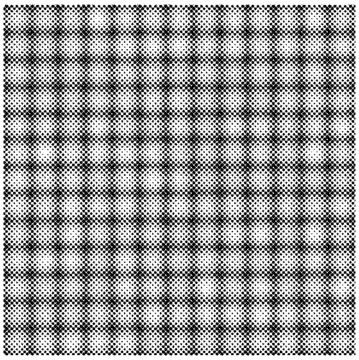
FIG. 22 is an explanatory diagram concerning a diffuser plate according to Comparative Example 3.
Figure 22:
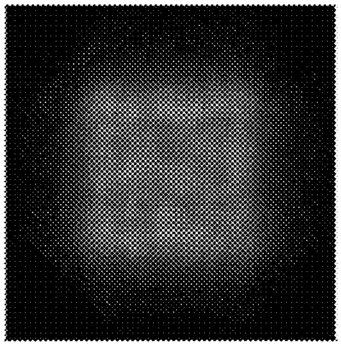
Figure 22:
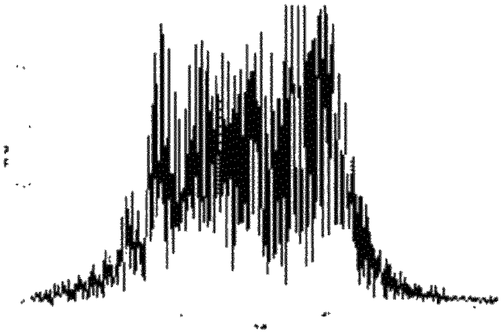
Figure 23:
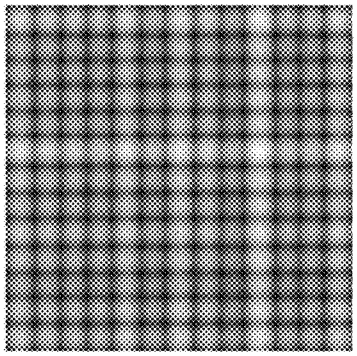
FIG. 23 is an explanatory diagram concerning a diffuser plate according to Example 1.
Figure 23:
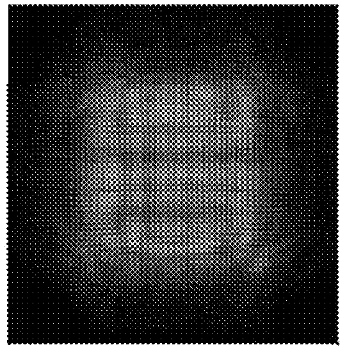
Figure 23:
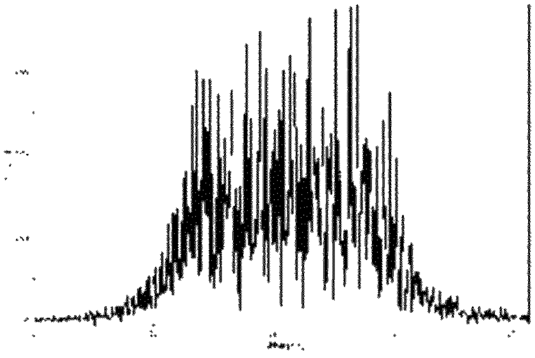
Figure 24:
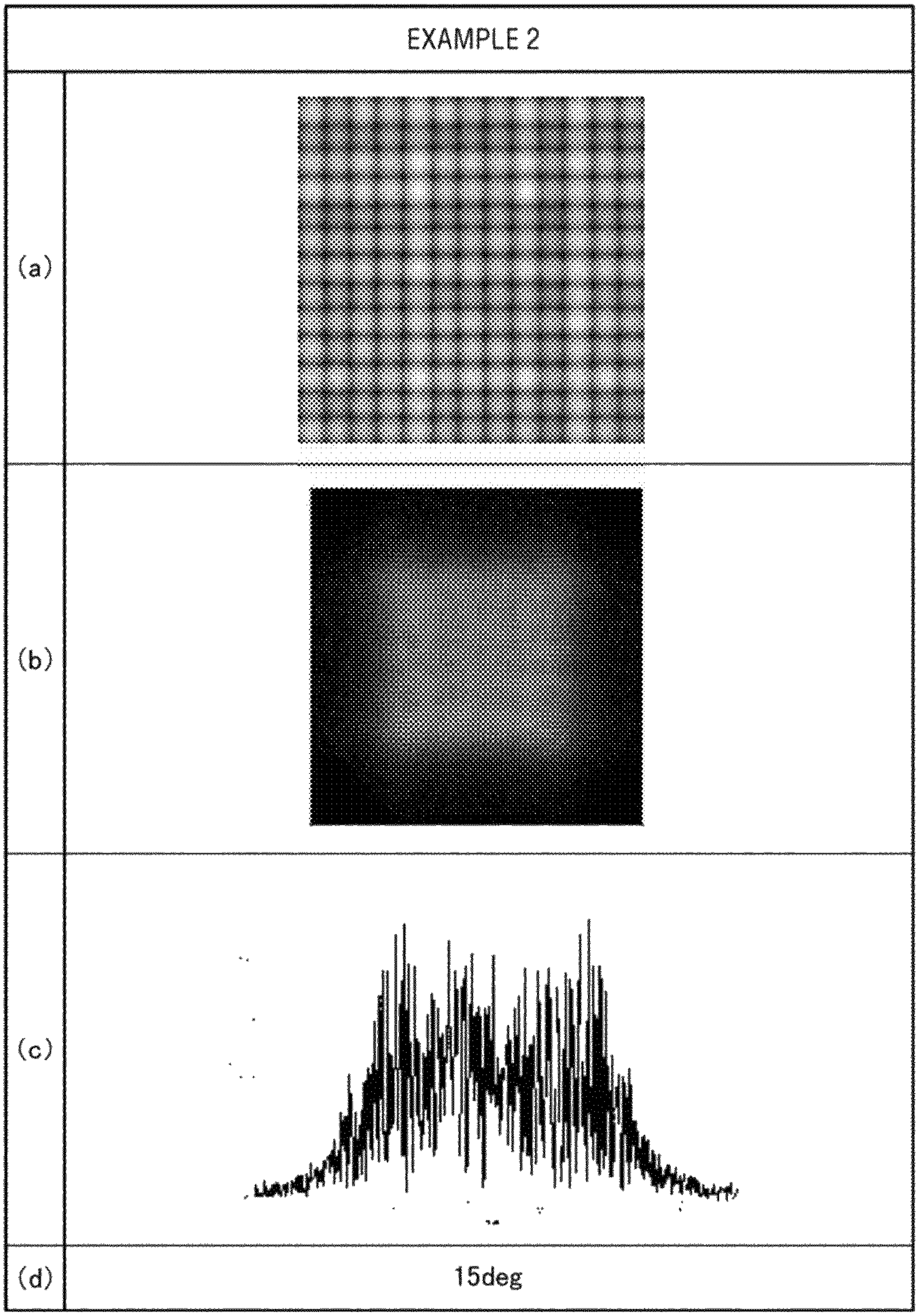
FIG. 24 is an explanatory diagram concerning a diffuser plate according to Example 2.
Figure 25:
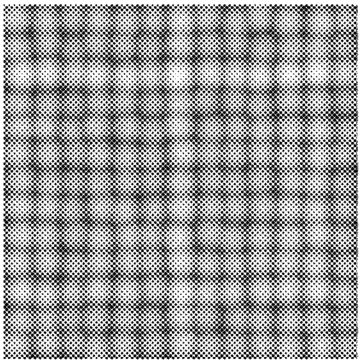
FIG. 25 is an explanatory diagram concerning a diffuser plate according to Example 3.
Figure 25:
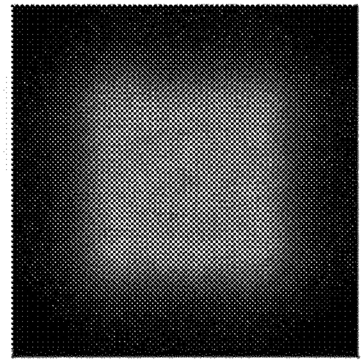
Figure 25:
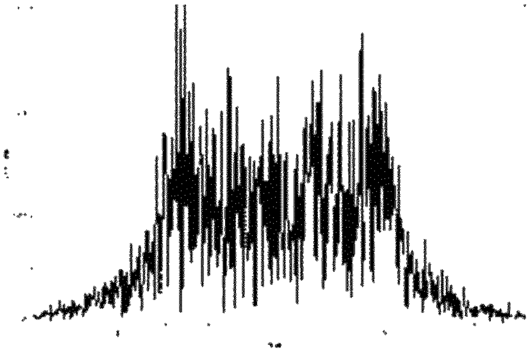
Figure 26:
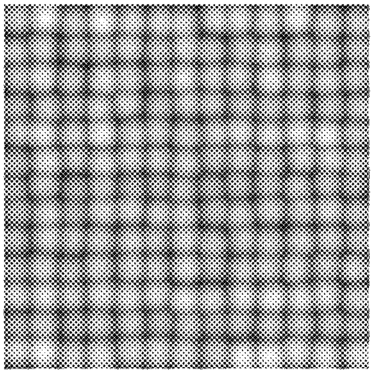
FIG. 26 is an explanatory diagram concerning a diffuser plate according to Example 4.
Figure 26:
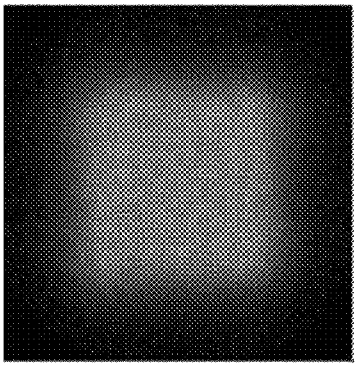
Figure 26:
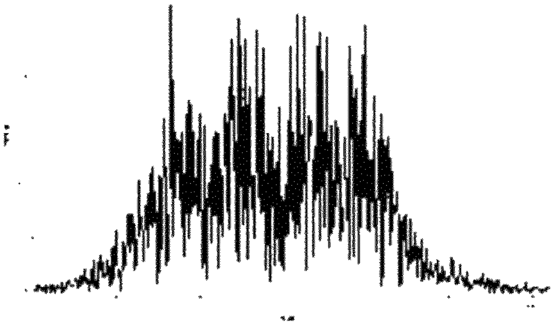
Figure 27:
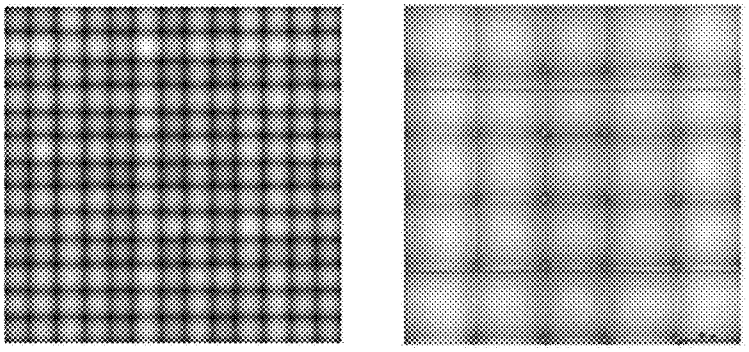
FIG. 27 is an explanatory diagram concerning a diffuser plate according to Example 5.
Figure 27:
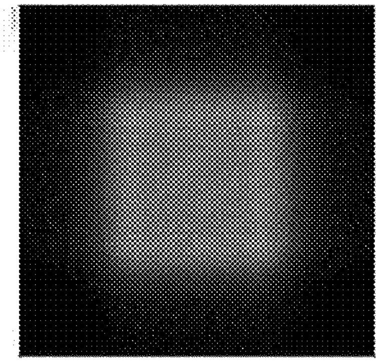
Figure 27:
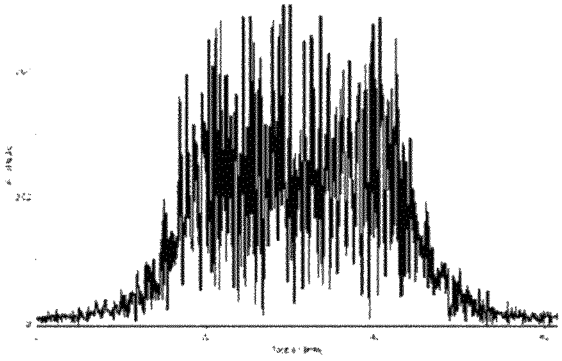
Figure 28:
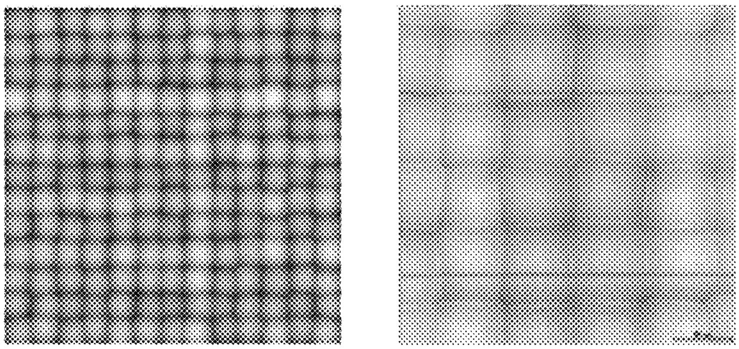
FIG. 28 is an explanatory diagram concerning a diffuser plate according to Example 6.
Figure 28:
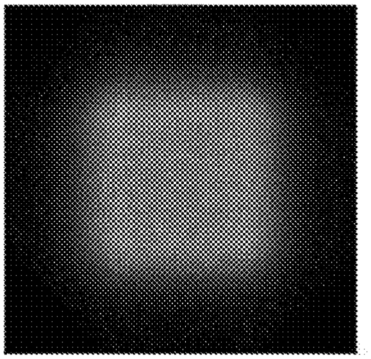
Figure 28:
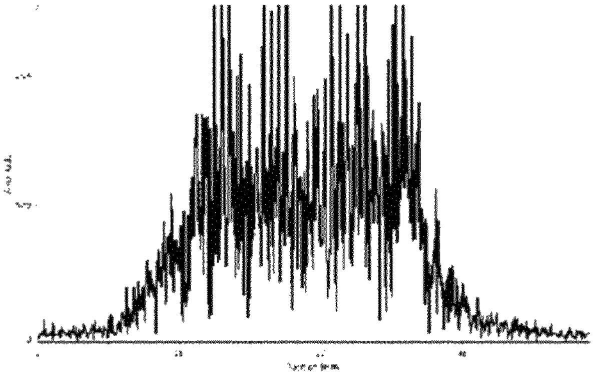
Figure 29:
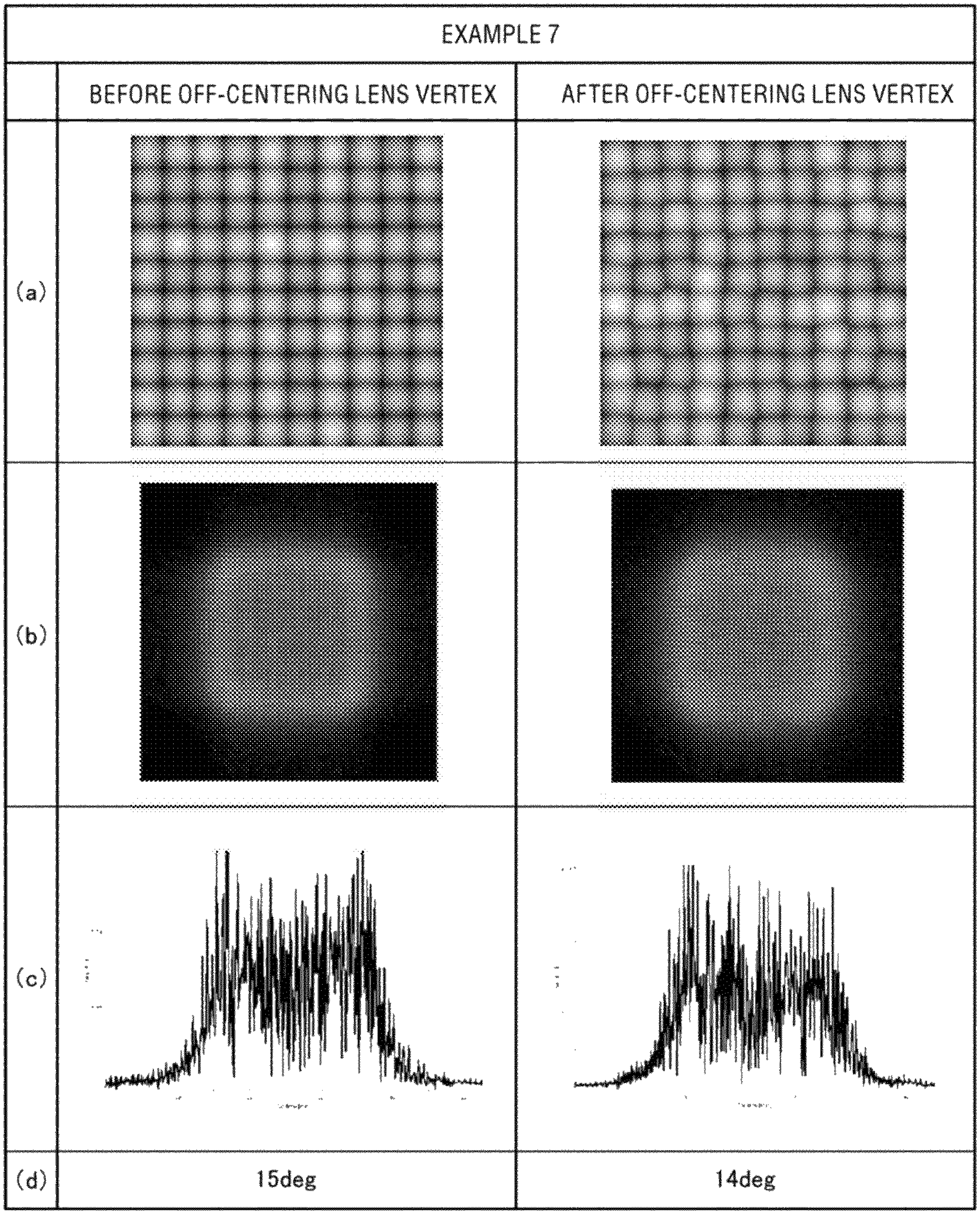
FIG. 29 is an explanatory diagram concerning a diffuser plate according to Example 7.

A method of manufacturing the diffuser plate 1 according to the present embodiment will now be described with reference to FIG. 19. FIG. 19 is a flowchart showing the method of manufacturing the diffuser plate 1 according to the present embodiment.

As shown in FIG. 19, in the method of manufacturing the diffuser plate 1 according to the present embodiment, a base material (a base material of a master original or the base material 10 of the diffuser plate 1) is cleaned first (step S101). The base material may be a rolled base material such as a glass roll, or may be a flat plate-like base material such as a glass wafer or a silicon wafer, for example.

Then, a resist is formed on a surface of the base material after cleaning (step S103). For example, a resist layer can be formed of a resist through use of a metal oxide. Specifically, on the rolled base material, the resist layer can be formed by resist spray coating or dipping treatment. On the other hand, on the flat plate-like base material, the resist layer can be formed by performing various types of resist coating treatment. Note that, as the resist, a positive photoresist may be used, or a negative photoresist may be used. In addition, a coupling agent may be used to increase adhesion between the base material and the resist.

Furthermore, the resist layer is exposed using a pattern corresponding to the shape of the microlens array 20 (step S105). To the exposure processing, a publicly-known exposure method such as, for example, exposure through use of a grayscale mask, multi-exposure performed by overlaying a plurality of grayscale masks, or laser exposure through use of picosecond pulsed laser, femtosecond pulsed laser, or the like is applied as appropriate.

Thereafter, the resist layer after the exposure is developed (S107). A pattern is formed in the resist layer through this development processing. The development processing can be executed using a developing solution appropriate for the material of the resist layer. For example, in a case in which the resist layer is formed of a resist through use of a metal oxide, the resist layer can be subjected to alkaline development using an inorganic or organic alkaline solution.

Then, by performing sputtering treatment or etching treatment using the resist layer after development (S109), a master original, in a surface of which the shape of the microlens array 20 has been formed, is completed (S111). Specifically, a glass base material is subjected to glass etching using the resist layer on which a pattern has been formed as a mask, so that a glass master can be manufactured. Alternatively, the resist layer on which a pattern has been formed is subjected to Ni sputtering or nickel plating (NED treatment) to form a nickel laver to which the pattern has been transferred, and then the base material is separated, so that a metal master can be manufactured. For example, the metal master original can be manufactured by forming a nickel layer to which the resist pattern has been transferred through Ni sputtering to a film thickness of approximately 50 nm, nickel plating (for example, nickel sulfamate bath) to a film thickness of 100 μm to 200 μm, or the like.

Furthermore, by transferring (imprinting) the pattern to a resin film or the like using the master original (for example, the glass master original or the metal master original) completed in S111 above, a soft mold, in a surface of which an inverted shape of the microlens array 20 has been formed, is created (S113).

Thereafter, by transferring the pattern of the microlens array 20 to the glass substrate, the film base material, or the like using the soft mold (S115), and further depositing a protective film, an anti-reflective film, or the like according to necessity (S117), the diffuser plate 1 according to the present embodiment is manufactured.

Note that the foregoing has described the example of manufacturing the soft mold (S113) using the master original (S111), and then manufacturing the diffuser plate 1 through transfer using the soft mold (S115). However, this is not a limitation, and a master original (for example, an inorganic glass original) in which an inverted shape of the microlens array 20 has been formed may be manufactured, and the diffuser plate 1 may be manufactured through imprinting using the master original. The diffuser plate 1 can be manufactured by, for example, applying a light curing acrylic resin to a base material made of PET (PolyEthylene Terephthalate) or PC (PolyCarbonate), transferring the pattern of the master original to the applied light curing acrylic resin, and UV curing the light curing acrylic resin.

On the other hand, in a case of directly processing a glass base material itself to manufacture the diffuser plate 1, the diffuser plate 1 according to the present embodiment is manufactured by, subsequent to the development processing in step S107, subjecting the base material 10 to dry etching treatment using a publicly known compound such as $CF_4$ (S119), and thereafter depositing a protective film, an anti-reflective film, or the like according to necessity (S121).

Note that the manufacturing method shown in FIG. 19 is merely an example, and the method of manufacturing the diffuser plate is not limited to the above-described example.

<8. Application Examples of Diffuser Plate 1>

Application examples of the diffuser plate 1 according to the present embodiment will now be described.

The diffuser plate 1 as described above can be mounted as appropriate on a device that needs to diffuse light in order to achieve its functions. Examples of such a device can include a display device such as various displays (for example, an LED and organic EL display), a projecting device such as a projector, and various lighting devices.

For example, the diffuser plate 1 is also applicable to a backlight of a liquid crystal display device, a diffuser plate-integrated lens, and the like, and also applicable to light shaping applications. In addition, the diffuser plate 1 is also applicable to a transmissive screen of a projecting device, a Fresnel lens, a reflective screen, and the like. In addition, the diffuser plate 1 is also applicable to various lighting devices to be utilized for spot illumination, base illumination, and the like, various specialized lightings, various screens such as an intermediate screen and a final screen, and the like. Furthermore, the diffuser plate 1 is also applicable to applications such as control over diffusion of light source light in an optical device, and can also be applied to light distribution control in an LED light source device, light distribution control in a laser light source device, distribution control over incident light to various light valve systems, and the like.

Note that devices to which the diffuser plate 1 is applied are not limited to the above-described application examples, but the diffuser plate 1 is also applicable to any publicly-known device that utilizes distribution of light.

EXAMPLES

Diffuser plates according to examples of the present invention will now be described. Note that the following examples are mere examples for indicating the effects and practicability of the diffuser plate according to the present invention, and the present invention is not limited to the following examples.

Diffuser plates according to the examples and comparative examples were manufactured by a manufacturing method which will be described below with the surface structure of the microlens array changed.

Specifically, a glass base material was cleaned first, and then, a photoresist was applied to one surface (a principal surface) of the glass base material to a resist thickness of 2 μm to 15 μm. As the photoresist, a positive photoresist such as, for example, PMER-LA900 (made by TOKYO OHKA KOGYO CO., LTD.) or AZ4620 (registered trademark) (made by AZ Electronic Materials) was used.

Next, a pattern was drawn on the resist on the glass base material with a laser drawing device through use of laser having a wavelength of 405 nm, and the resist layer was exposed. Note that the resist layer may be exposed by subjecting the resist on the glass base material to mask exposure with a stepper exposure device through use of g-line.

Subsequently, the resist layer was developed to form a pattern on the resist. As a developing solution, a tetramethylammonium hydroxide (TMAH) solution such as, for example, NMD-W (made by TOKYO OHKA KOGYO CO., LTD.) or PMER P7G (made by TOKYO OHKA KOGYO CO., LTD.) was used.

Next, the glass base material was etched using the resist on which the pattern had been formed to manufacture a diffuser plate. Specifically, the resist pattern was formed on the glass base material by glass etching through use of Ar gas or $CF_4$ gas to manufacture a diffuser plate.

Table 1 relates to diffuser plates according to the examples and comparative examples manufactured as described above, and shows designing conditions for the surface structures of the microlens arrays and evaluation results of uniformity of light distribution achieved by the diffuser plates.

TABLE 1

| | | | Reference grid interval W_k (μm) | | Varying rate of grid interval δW (±%) | | Reference curvature radius R_k (μm) | | Varying rate of curvature radius δR (±%) | | Off-centering rate of lens vertex δEc (±%) | | |
|---|---|---|---|---|---|---|---|---|---|---|---|---|---|
| No. | Lens shape | Array shape | Wx_k | Wy_k | δWx | δWy | Rx_k | Ry_k | δRx | δRy | δEcx | δEcy | Grade |
| Comparative example 1 | spherical | square | 60 | 60 | 0 | 0 | 110 | 110 | 0 | 0 | 0 | 0 | C |
| Comparative example 2 | spherical | square | 60 | 60 | 0 | 0 | 110 | 110 | 0 | 0 | 10 | 10 | C |
| Comparative example 3 | spherical | square | 60 | 60 | 0 | 0 | 110 | 110 | 10 | 10 | 0 | 0 | C |
| Example 1 | spherical | square | 60 | 60 | 10 | 10 | 110 | 110 | 0 | 0 | 0 | 0 | B |
| Example 2 | spherical | square | 60 | 60 | 10 | 10 | 110 | 110 | 10 | 10 | 0 | 0 | A |
| Example 3 | spherical | square | 60 | 60 | 10 | 10 | 110 | 110 | 0 | 0 | 10 | 10 | A |
| Example 4 | spherical | square | 60 | 60 | 10 | 10 | 110 | 110 | 10 | 10 | 10 | 10 | A |
| Example 5 | aspherical | square | 60 | 60 | 10 | 10 | 110 | 110 | 10 | 10 | 0 | 0 | A |
| Example 6 | aspherical | square | 60 | 60 | 10 | 10 | 110 | 110 | 10 | 10 | 10 | 10 | A |
| Example 7 | aspherical | square | 80 | 80 | 10 | 10 | 150 | 150 | 10 | 10 | 10 | 10 | A |
| Comparative example 4 | spherical | rectangular | 50 | 40 | 0 | 0 | 70 | 70 | 0 | 0 | 0 | 0 | C |
| Example 8 | spherical | rectangular | 50 | 40 | 10 | 10 | 70 | 70 | 10 | 10 | 10 | 10 | A |
| Example 9 | spherical | rectangular | 50 | 40 | 15 | 15 | 70 | 70 | 15 | 15 | 15 | 15 | A |

In each of the examples and comparative examples shown in Table 1, a microlens array was designed by the aforementioned designing method shown in FIG. 14 to FIG. 18. On that occasion, various parameters such as grid parameters (Wx_k, Wy_k, δWx, δWy, δEcx, δEcy) and lens parameters (Rx_k, Ry_k, δRx, δRy) shown in Table 1 were changed as appropriate to produce a pattern of surface shapes of microlenses different from each other. Then, a lens pattern representing the shapes and arrangement of microlenses according to each of the examples and comparative examples was output. This lens pattern was used to manufacture a diffuser plate according to each of the examples and comparative examples by the above-described manufacturing method.

As shown in Table 1, in Examples 1 to 9, the grid intervals Wx and Wy of each of the microlenses were varied at random when designing the surface structure of the microlens array. In contrast, in Comparative Examples 1 to 4, the grid intervals of all the microlenses were set at the constant reference grid intervals Wx_k and Wy_k without varying the grid intervals Wx and Wy.

In addition, the curvature radius Rx and the curvature radius Ry were set at fixed values or random varying values in each of the examples and comparative examples, as shown in Table 1. It means that, in the case in which the varying rates δRx and δRy=±0%, the curvature radii Rx and Ry of each of the microlenses were set at fixed values without being varied, and in the case in which the varying rates δRx and δRy=±10% and ±15%, the curvature radii Rx and Ry were varied at random within the ranges of the varying rates δRx and Ry. In addition, off-centering of the lens vertex position on the X-Y plane means that, in the case in which the off-centering rates δEcx and δEcy=±0%, the lens vertex position was not off-centered, and in the case in which the off-centering rates δEcx and δEcy=±10% and ±15%, the lens vertex position was off-centered at random within the ranges of the off-centering rates δEcx and δEcy.

In addition, the surface shapes of the microlenses had spherical shapes in Examples 1 to 4, 8, 9 and Comparative Examples 1 to 3, and had aspherical shapes (for example, anamorphic shapes) in Examples 5 to 7. In addition, the planar shapes of the microlens arrays were square in Examples 1 to 7 and Comparative Examples 1 to 3, and were rectangular (rectangular shape longer in the X direction) in Examples 8, 9 and Comparative Example 4.

The surface shapes of the microlens arrays of the diffuser plates according to Examples 1 to 9 and Comparative Examples 1 to 4 manufactured as described above were observed with a laser microscope. Furthermore, a light distribution pattern of each of the diffuser plates was simulated with Virtual-Lab (made by LightTrans GmbH), and a light distribution property of each of the diffuser plates was measured with a light distribution property measuring instrument, Mini-Diff (made by Light Tec). In addition, in order to measure the light distribution properties of the diffuser plates, an intensity distribution of diffused light was measured from captured images of laser light intensity (far-field pattern measurement which will be described later).

Simulation results and actual measurement results of patterns of the surface shapes of the microlens arrays, light distribution properties of diffused light, luminance distributions, and the like of the diffuser plates according to Examples 1 to 9 and Comparative Examples 1 to 4 are shown in FIG. 20 to FIG. 33, respectively.

In FIG. 20 to FIG. 33 (Examples 1 to 9 and Comparative Examples 1 to 4), an image (BMP) or a confocal laser microscope image (50×) indicating a pattern of surface shapes of the microlens array is shown at (a), an image indicating a result of simulation of light distribution performed through an electromagnetic field analysis is shown at (b), a graph indicating a result of simulation of luminance distribution of diffused light (horizontal axis: coordinate position, vertical axis: luminance) is shown at (c), and a diffusion angle (a full width at half maximum (FWHM), Screen Z=100 mm) in the luminance distributions at (c) above is shown at (d).

Figure 30:
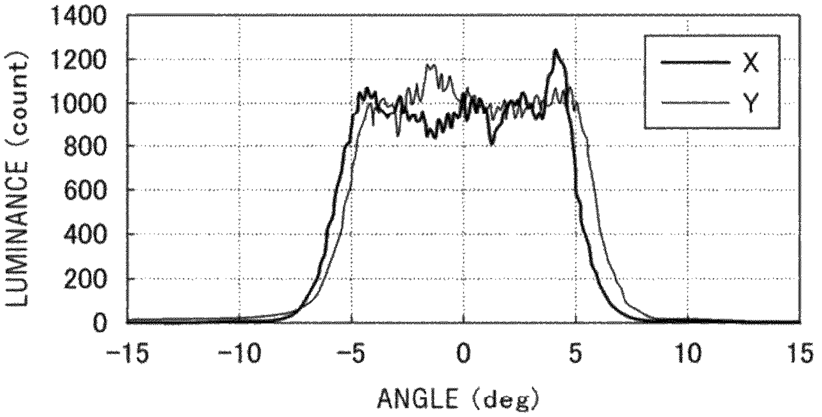
FIG. 30 is an explanatory diagram concerning the diffuser plate according to Example 7.
Figure 30:
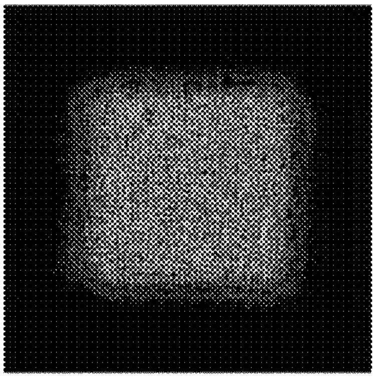

In addition, in FIG. 30 (Example 7), a graph indicating an actual measurement result obtained by measuring a far field pattern (FFP) of diffused light of a laser light source using a diffuser plate actually manufactured is shown at (e) (horizontal axis: diffusion angle, vertical axis: luminance), diffusion angles (full width at half maximum (FWHM)) in the X and Y directions in the FFP at (e) are shown at (f), and an FFP image indicating an actual measurement result of (e) is shown at (g).

Figure 32:
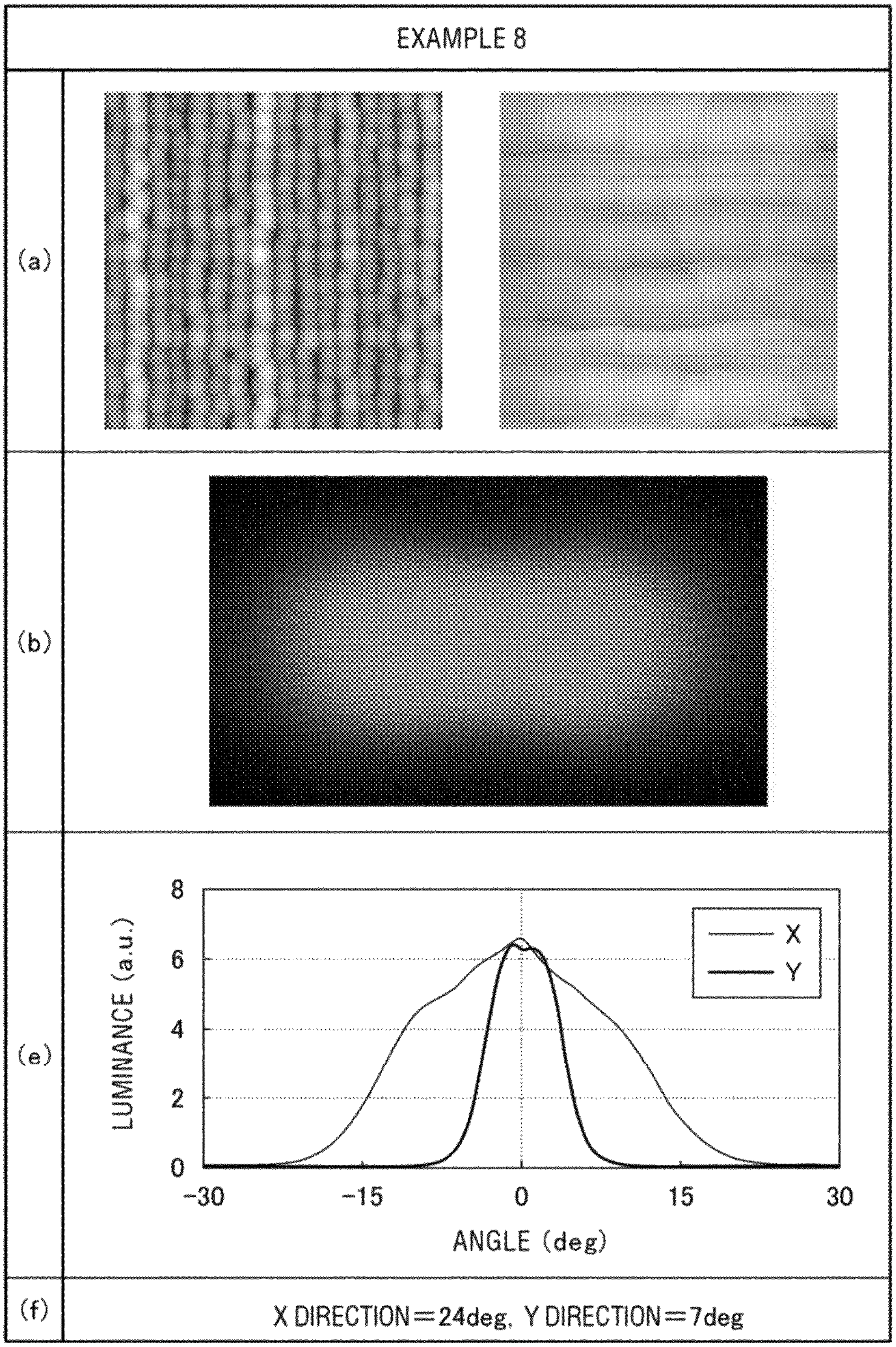
FIG. 32 is an explanatory diagram concerning a diffuser plate according to Example 8.
Figure 33:
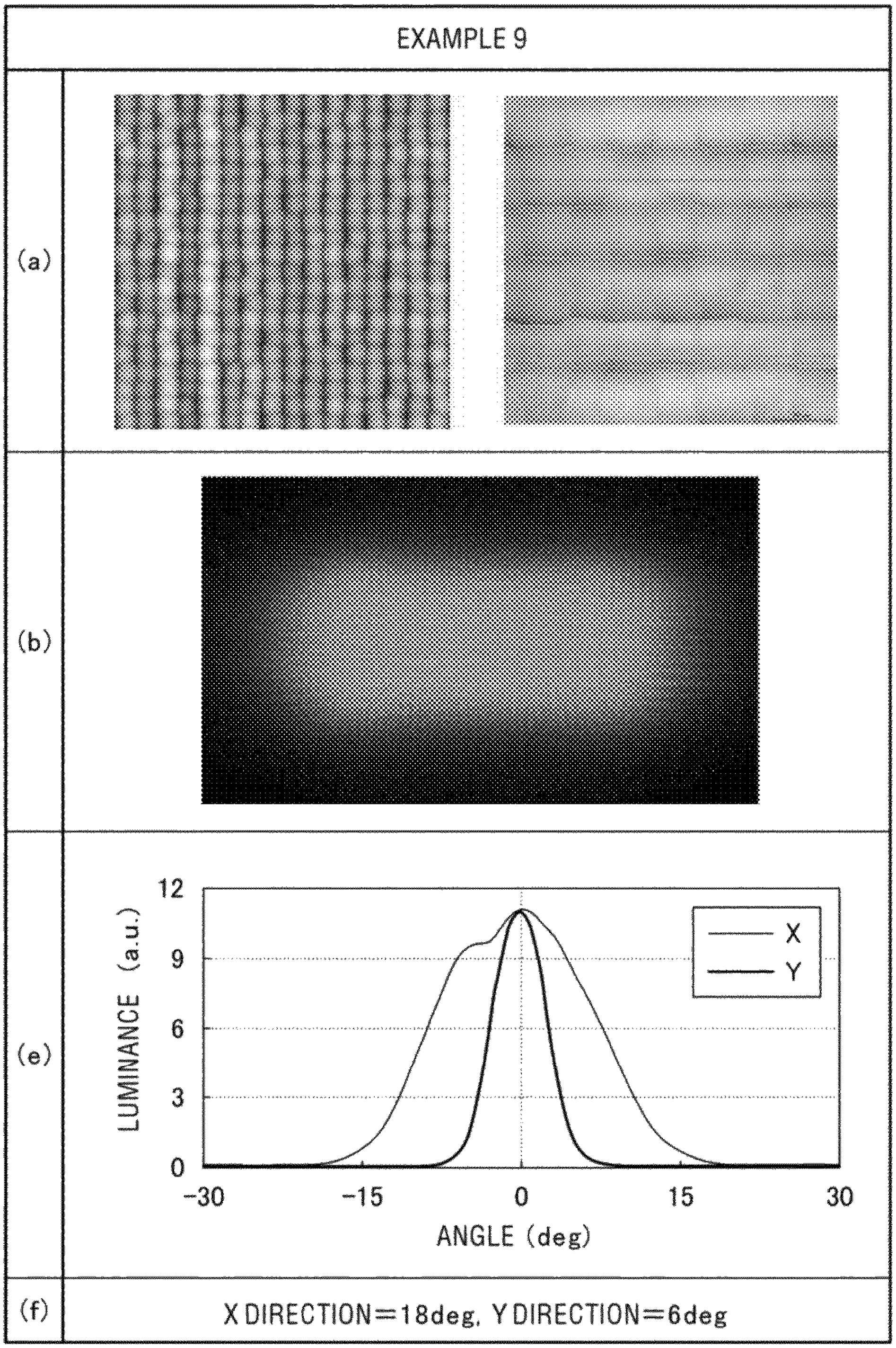
FIG. 33 is an explanatory diagram concerning a diffuser plate according to Example 9.

In addition, in FIG. 32 and FIG. 33 (Examples 8 and 9), a graph indicating a result of simulation of light distribution properties of diffused light in the X and Y directions is shown at (e) (horizontal axis: diffusion angle, vertical axis: luminance), and diffusion angles (full width at half maximum (FWHM)) in the X and Y directions in the luminance distribution at (c) above are shown at (f).

The light distribution properties (such as uniformity of light distribution) of the diffuser plates according to Examples 1 to 9 and Comparative Examples 1 to 3 as described above were evaluated on three scales (grades A, B, and C) according to the following evaluation criteria. Such evaluation results are shown in Table 1.

Grade A: The uniformity of diffused light in the X direction and the Y direction was sufficiently high, and unevenness in the luminance distribution along the rectangular grid was not observed. The luminance distribution of diffused light was generally uniform within the range of predetermined diffusion angles, and within the range of the predetermined diffusion angles, a luminance value of diffused light fell within the range of ±20% centering on an average value of peak levels.

Grade B: The uniformity of diffused light in the X direction and the Y direction was high, and there was slight unevenness in the luminance distribution along the rectangular grid, but significant unevenness was not observed. The luminance distribution of diffused light was generally uniform within the range of predetermined diffusion angles, and within the range of the predetermined diffusion angles, the luminance value of diffused light fell within the range of ±40% centering on an average value of peak levels.

Grade C: The uniformity of diffused light in the X direction and the Y direction was insufficient, and significant unevenness in the luminance distribution was observed along the rectangular grid. The luminance distribution of diffused light fluctuated within the range of predetermined diffusion angles, and within the range of the predetermined diffusion angles, the luminance value of diffused light did not fall within the range of ±40% centering on an average value of peak levels.

Evaluation results of Examples 1 to 9 and Comparative Examples 1 to 4 will be described below in comparison.

(1) Comparison Between Examples 1 to 9 and Comparative Examples 1 to 4 (Effects of Irregularity of Grid Intervals)

In Comparative Examples 1 to 4, the luminance significantly increased and decreased periodically in the luminance distribution of diffused light, and unevenness in the form of a rectangular grid occurred in the luminance distribution of diffused light as shown in FIG. 20 to FIG. 22 and FIG. 31, so that the uniformity of light distribution of diffused light was insufficient. The reason is considered as follows.

In Comparative Examples 1 to 4, the rectangular grid to be used as a reference of disposition of the microlenses was a regular rectangular grid, and the grid intervals in the X and Y directions were fixed at the constant values Wx_k and Wy_k (δWx and δWy=±0%). It is therefore considered that the periodic structure of microlens disposition in the form of the regular rectangular grid caused diffraction in diffused light from each of the microlenses, so that unevenness occurred in the luminance distribution, and the uniformity of light distribution was degraded.

In this respect, off-centering the lens vertex position as in Comparative Example 2 or varying the curvature radii Rx and Ry at random as in Comparative Example 3 allowed the uniformity of luminance distribution to be improved to some degree. However, it is considered that, in the case in which the grid intervals Wx and Wy were constant as in Comparative Examples 1 to 4, luminance unevenness caused by diffraction resulting from the periodicity of the grid intervals exceeded the effect of improving the uniformity by varying the lens vertex positions and the curvature radii Rx and Ry, which interfered with the uniformity of light distribution.

In contrast, in Examples 1 to 9, the luminance varied in the luminance distribution of diffused light, but periodic increase/decrease or periodic peaks were not observed, so that unevenness in the luminance distribution of diffused light was sufficiently reduced, and the uniformity of light distribution of diffused light was excellent. The reason is considered as follows.

In Examples 1 to 9, microlenses were disposed on the X-Y plane using the rectangular grid as a reference. Herein, the rectangular grids of Examples 1 to 9 were not regular rectangular grids as in the comparative examples, but were quasi-regular rectangular grids having irregularity in the grid intervals Wx and Wy. In other words, as shown in FIG. 15, the grid intervals Wx and Wy of the rectangular grids of Examples 1 to 9 were varied at random so as to have values different from each other, and the varying rates δWx and δWy thereof were more than or equal to ±10%. Disposing a plurality of microlenses using such a rectangular grid having irregularity as a reference enabled the aperture sizes Dx, Dy and planar shapes of the microlenses to be varied at random, and enabled the positions of the boundary lines between adjacent microlenses to be shifted at random.

As a result, as shown in FIG. 2, FIG. 4, FIG. 18, and the like, for example, the contour lines of the planar shapes of the microlenses (the boundary lines between microlenses) are composed of a combination of curves having any curvature radii and straight lines. Accordingly, regularity of arrangement at the boundaries between the microlenses is deformed further, and the diffraction component can be reduced further. This can prevent diffused light from diffracting mutually between a plurality of microlenses to improve the uniformity of light distribution of diffused light in the whole microlens array.

The above results reveal that the use of the diffuser plate of the present invention can reduce unevenness in the luminance distribution in the two directions orthogonal to each other (the X and Y directions) to sufficiently improve the uniformity of light distribution.

(2) Comparison Between Example 1 and Examples 2 to 9 (Effects of Varying Curvature Radii and Off-Centering Lens Vertices)

As shown in Table 1, only the grid intervals Wx and Wy were varied in Example 1. In contrast, in Examples 2 to 9, the curvature radii Rx and Ry were varied in addition to the grid intervals Wx and Wy, and the lens vertex positions were off-centered.

As a result, Examples 2 to 9 (grade A) were able to reduce unevenness in the luminance distribution more effectively than in Example 1 (grade B) to improve the uniformity of light distribution of diffused light. This reveals that, from the perspective of improvement of the uniformity of light distribution, varying the curvature radii Rx and Ry in addition to the grid intervals Wx and Wy and off-centering the lens vertex positions are effective.

Furthermore, in Examples 2, 3, and 5, the curvature radii Rx and Ry were vaned, or the lens vertex positions were off-centered. In contrast, in Examples 4 and 6 to 9, the curvature radii Rx and Ry were varied, and the lens vertex positions were also off-centered. As a result, Examples 4 and 6 to 9 were able to reduce unevenness in the luminance distribution further to improve the uniformity of light distribution of diffused light further, as shown in the electromagnetic field analysis images at (b) and the graphs of luminance distribution at (c) in FIG. 24 to FIG. 29, FIG. 32, and FIG. 33. This reveals that, from the perspective of improvement of the uniformity of light distribution, performing both varying the curvature radii Rx and Ry in addition to the grid intervals Wx and Wy and off-centering the lens vertex positions is more effective.

(3) Comparison Between Examples 1 to 4 and Examples 5 to 7 (Effects of Aspherical Lens Shape)

As shown in Table 1, spherical lenses were used in Examples 1 to 4 as the basic shape of microlenses. In contrast, aspherical lenses (for example, the anamorphic lenses shown in FIG. 8 to FIG. 10) were used in Examples 5 to 7. In the case of the aspherical lenses of Examples 5 to 7, the aspherical coefficient $A_4$ in the fourth term on the right side of Expression (1) defining the aforementioned anamorphic curved surface was corrected to define the lens shape.

As a result, as shown in the electromagnetic field analysis images at (b) and the graphs of luminance distribution at (c) in FIG. 23 to FIG. 29, the aspherical lenses of Examples 5 to 7 were able to reduce unevenness in the luminance distribution more than the spherical lenses of Examples 1 to 4, and achieve finer light distribution uniformity. This reveals that, from the perspective of improvement of the uniformity of light distribution, the use of the aspherical lenses is more effective than to use the spherical lenses. Furthermore, the use of the aspherical lenses having anisotropy enables anisotropy of diffused light projected from the diffuser plate to be controlled. Thus, light distribution angles can be controlled to have anisotropy between the X direction and the Y direction while achieving high uniformity of diffused light.

(4) Diffusion Properties of Example 7 (Excellent Light Distribution Uniformity and Cut-Off Property)

As shown in Table 1, in Example 7, the reference curvature radii Rx_k and Ry_k were set at a relatively large value (150 μm), and the curvature radii Rx and Ry were varied within the ranges of ±10% of Rx_k and Ry_k, and the lens vertex positions were off-centered within the range of the off-centering rates δEcx and δEcy=±10%.

Furthermore, the surface shapes of the microlenses in Example 7 were aspherical shapes in which the ratio between the reference curvature radii Rx_k, Ry_k [μm] and the reference grid intervals Wx_k, Wy_k [μm] satisfied relational expressions (A) and (B) below. In Example 7, (Rx_k/Wx_k)=(Ry_k/Wy_k)=(150/80)=1.875.

$$Rx\_k/Wx\_k \geq 1.85 \quad \text{(A)}$$

$$Ry\_k/Wy\_k \geq 1.85 \quad \text{(B)}$$

The surface shapes of the microlenses according to Example 7 were aspherical shapes having anisotropy as described above, and the grid intervals Wx, Wy, and the curvature radii Rx, Ry were varied, and the lens vertex positions were off-centered under the conditions shown in Table 1, and the reference curvature radii Rx_k, Ry_k [μm] and the reference grid intervals Wx_k, Wy_k [μm] were adjusted so as to satisfy the relational expressions (A) and (B) above. Furthermore, the diffusion angle (full width at half maximum (FWHM)) of diffused light output from the diffuser plate fell within a range of less than or equal to 20°. This enabled what is called the top hat diffusion property to be achieved more reliably.

As shown in the graph of FFP measurement result in FIG. 30(*e*), the diffusion property of Example 7 achieved the top hat diffusion property. In other words, a state was achieved in which the luminance distribution of diffused light incident on the microlens array was generally uniform in a predetermined diffusion angle range (the range of less than or equal to 20° at the full width at half maximum: in the example of FIG. 10, −5 to +5°), and within the diffusion angle range, the luminance value of diffused light fell within the range of ±20% centering on an average value of peak levels.

The above results reveal that the use of a diffuser plate similar to that of Example 7 above enables, within the range in which the diffusion angle (full width at half maximum) is less than or equal to 20°, anisotropy of light distribution in the X and Y directions and the cut-off property of intensity distribution of diffused light to be controlled properly while sufficiently improving uniformity of light distribution in the two directions (the X and Y directions) orthogonal to each other.

(7) Comparison Between Examples 8, 9 and Comparative Example 4 (Effects of Rectangular Aspherical Lens Shape)

For the diffuser plates according to Examples 8, 9 and Comparative Example 4, rectangular microlens arrays extending long in the X direction were used. The reference grid intervals Wx_k=50 μm, Wy_k=40 μm, and the reference grid interval Wx_k in the longitudinal direction (the X direction) of the microlens arrays was set to be larger than the reference grid interval Wy_k in the shorter side direction (the Y direction) (Wx_k>Wy_k).

In the rectangular microlens arrays, the grid intervals Wx and Wy were not varied in Comparative Example 4. On the other hand, in Examples 8 and 9, the grid intervals Wx and Wy were varied at random within the range of ±10% or ±15%, and the curvature radii Rx and Ry were vaned at random within the range of ±10% or ±15%. Furthermore, in Examples 8 and 9, the lens vertex positions were also off-centered at random within the range of ±10% or ±15%.

Figure 31:
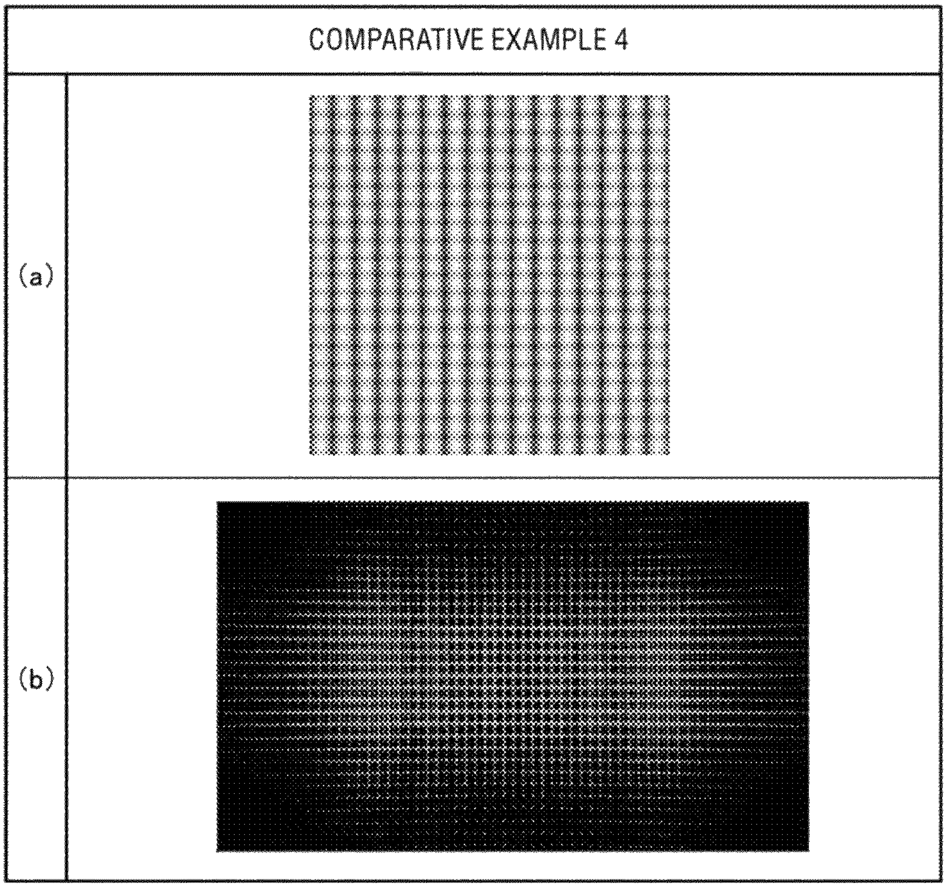
FIG. 31 is an explanatory diagram concerning a diffuser plate according to Comparative Example 4.

As a result, in Comparative Example 4, the luminance distribution of diffused light significantly increased and decreased periodically, unevenness in the form of a rectangular grid occurred remarkably, and the uniformity of light distribution of diffused light was insufficient, as shown in FIG. 31. On the other hand, in Examples 8 and 9, periodic increase/decrease or peaks were not observed in the luminance distribution of diffused light, unevenness in the luminance distribution of diffused light was sufficiently reduced, and the uniformity of light distribution of diffused light was excellent.

The above results reveal that, even in a case of using a rectangular microlens array as in Examples 8 and 9, uniformity of light distribution can be improved sufficiently in the two directions (the X and Y directions) orthogonal to each other.

The preferred embodiment(s) of the present invention has/have been described above with reference to the accompanying drawings, whilst the present invention is not limited to the above examples. A person skilled in the art may find various alterations or modifications within the scope of the appended claims, and it should be understood that they will naturally come under the technical scope of the present invention.

REFERENCE SIGNS LIST

1 Diffuser plate
3 Unit cell

10 Base material
20 Microlens array
21 Microlens
22 Vertex of microlens
23 Central point of rectangle
Wx, Wy Grid interval
Rx, Ry Curvature radius
Ecx, Ecy Off-centering amount
Wx_k, Wy_k Reference grid interval
Rx_k, Ry_k Reference curvature radius
δWx, δWy Varying rate
δRx, δRy Varying rate
δEcx, δEcy Off-centering rate
R Larger circle radius
r Smaller circle radius

The invention claimed is:

1. A diffuser plate of a microlens array type comprising:

a base material; and a microlens array composed of a plurality of microlenses disposed quasi-regularly on an X-Y plane on at least one surface of the base material using an irregular rectangular grid having grid intervals Wx and Wy different from each other as a reference, wherein the grid intervals Wx in an X direction of the microlenses disposed in the X direction of the rectangular grid are different from each other, and the grid intervals Wy in a Y direction of the microlenses disposed in the Y direction of the rectangular grid are different from each other, such that the grid is a rectangular grid whose columns and rows have widths and heights that are varied from each other, but are constant within each column or row, and surface shapes of the plurality of microlenses are different from each other, wherein the grid intervals Wx in the X direction are each varied at a varying rate δWx within ±10% using a reference grid interval Wx_k as a reference, and the grid intervals Wy in the Y direction are each varied at a varying rate δWy within ±10% using a reference grid interval Wy_k as a reference, wherein the curvature radii Rx in the X direction are each varied at a varying rate δRx within ±10% using a reference curvature radius Rx_k as a reference, and the curvature radii Ry in the Y direction are each varied at a varying rate δRy within ±10% using a reference curvature radius Ry_k as a reference, wherein the surface shapes of the plurality of microlenses are aspherical shapes in which the reference grid intervals Wx_k, Wy_k and the reference curvature radii Rx_k, Ry_k satisfy relational expressions (A) and (B) below, and a diffusion angle (a full width at half maximum) of diffused light output from the diffuser plate is less than or equal to 20°:

$$Rx\_k/Wx\_k \geq 1.85 \quad \text{(A); and}$$

$$Ry\_k/Wy\_k \geq 1.85 \quad \text{(B).}$$

2. The diffuser plate according to claim 1, wherein a planar position of a vertex of each of the microlenses disposed in the X direction and the Y direction is off-centered from a central point of each of rectangles of the rectangular grid.

3. The diffuser plate according to claim 2, wherein when distances in the X direction and the Y direction from the central point of each of the rectangles to the planar position of the vertex of each of the microlenses having been off-centered are denoted by an off-centering amount Ecx and an off-centering amount Ecy, respectively, and proportions of the off-centering amounts Ecx and Ecy with respect to the grid intervals Wx and Wy of the rectangular grid are denoted by an off-centering rate δEcx and an off-centering rate δEcy, respectively, the planar position of the vertex of each of the microlenses is off-centered at the off-centering rates δEcx and δEcy within ±10% to ±50%.

4. The diffuser plate according to claim 1, wherein height positions of vertices of the plurality of microlenses disposed in the X direction and the Y direction are different from each other.

5. The diffuser plate according to claim 1, wherein the microlenses disposed in the X direction and the Y direction are arranged continuously with no gap between each other.

6. The diffuser plate according to claim 1, wherein a boundary line between adjacent ones of the microlenses includes a straight line and a curve.

7. The diffuser plate according to claim 1, wherein the microlens array includes a plurality of unit cells which are basic arrangement patterns of the microlenses, and the microlens array is configured by disposing the plurality of unit cells with no gap between each other while maintaining continuity of the microlenses at boundary portions between the plurality of unit cells.

8. The diffuser plate according to claim 1, wherein surface shapes of the microlenses are aspherical shapes having anisotropy in the X direction or the Y direction.

9. A display device comprising:

the diffuser plate as defined in claim 1.

10. A projecting device comprising:

the diffuser plate as defined in claim 1.

11. A lighting device comprising:

the diffuser plate as defined in claim 1.

* * * * *